US008467733B2

(12) United States Patent
Leabman

(10) Patent No.: US 8,467,733 B2
(45) Date of Patent: Jun. 18, 2013

(54) SYSTEM AND METHODS FOR WIRELESS BROADBAND DELIVERY OF DATA

(75) Inventor: Michael A. Leabman, San Ramon, CA (US)

(73) Assignee: TruePath Holdings LLC, Richmond, VA (US)

( * ) Notice: Subject to any disclaimer, the term of this patent is extended or adjusted under 35 U.S.C. 154(b) by 242 days.

(21) Appl. No.: 12/830,324

(22) Filed: Jul. 4, 2010

(65) Prior Publication Data

US 2011/0034191 A1  Feb. 10, 2011

Related U.S. Application Data

(60) Provisional application No. 61/213,999, filed on Aug. 6, 2009, provisional application No. 61/272,001, filed on Aug. 6, 2009.

(51) Int. Cl.
*H04B 1/00* (2006.01)

(52) U.S. Cl.
USPC ............................ 455/63.4; 455/431; 455/501

(58) Field of Classification Search
USPC .......................................... 455/63.4, 501, 431
See application file for complete search history.

(56) References Cited

U.S. PATENT DOCUMENTS

| | | | |
|---|---|---|---|
| 5,343,212 A * | 8/1994 | Rose et al. ..................... | 342/424 |
| 5,790,071 A | 8/1998 | Silverstein et al. | |
| 6,430,412 B1 | 8/2002 | Hogg et al. | |
| 6,642,894 B1 | 11/2003 | Gross et al. | |
| 6,931,247 B2 | 8/2005 | Cox et al. | |
| 7,359,703 B2 | 4/2008 | McGuffin et al. | |
| 7,558,569 B2 | 7/2009 | Chang et al. | |
| 2002/0024975 A1 | 2/2002 | Hendler | |
| 2005/0026621 A1* | 2/2005 | Febvre et al. ................. | 455/450 |
| 2006/0178143 A1 | 8/2006 | Chang et al. | |

(Continued)

OTHER PUBLICATIONS

S.H. Breheny et al. "Using Airborne Vehicle-Based Antenna Arrays to Improve Communications with UAV Clusters", Proceedings of the 42$^{nd}$ IEEE Conference on Decision and Control, Hawaii USA, Dec. 2003, pp. 4158-4162.

(Continued)

*Primary Examiner* — Edward Urban
*Assistant Examiner* — Hsin-Chun Liao
(74) *Attorney, Agent, or Firm* — Kang S. Lim

(57) ABSTRACT

A system and method for wireless data delivery is provided. The communication may be between the antenna arrays of an airborne platform (such as aircraft) and a surface base station. The antenna arrays may generate a plurality of directional synchronization beams directed in at a plurality of corresponding spatial directions. Other antenna arrays receive the directional synchronization beam and respond in kind, providing the original antenna array a way to determine directionality of the other antenna arrays. The antenna arrays may then receive a training beam. The training beam includes known data, such as a Fourier Matrix, which may then be utilized to generate weights. Weights may then be utilized to modify either of the phase or amplitude of a base signal which is then sent to each of the elements of the antenna array in order to achieve directionality of the signal propagation. Thus, a directional beam may be formed which is oriented toward the source of the training beam, which may be a base station or the like. It may also be desirable to identify sources of interference. Interference sources are all non-desired sources of radiation within the target frequency range. Lastly, the system may steer one or more nulls in order to substantially attenuate the sources of interference.

34 Claims, 16 Drawing Sheets

U.S. PATENT DOCUMENTS

| | | | |
|---|---|---|---|
| 2007/0087694 | A1 | 4/2007 | Jin et al. |
| 2007/0184846 | A1 | 8/2007 | Horton, Jr. et al. |
| 2007/0232299 | A1 | 10/2007 | Alcorn |
| 2007/0263748 | A1 | 11/2007 | Mesecher |
| 2008/0005219 | A1* | 1/2008 | Nabar et al. .................. 709/201 |
| 2008/0075037 | A1 | 3/2008 | Guo et al. |
| 2008/0139124 | A1 | 6/2008 | Tillotson |
| 2008/0240062 | A1 | 10/2008 | Lynch et al. |

OTHER PUBLICATIONS

H. Schippers et al., "Broadband Optical Beam Forming for Airborne Phased Array Antenna", 2008 IEEE Aerospace Conference, Mar. 8, 2008, pp. 1-17.

ISA/KR, PCT International Search Report and Written Opinion, Application No. PCT/US2010/044621, dated Apr. 21, 2011, 9 pages.

ISA/KR, PCT International Search Report and Written Opinion, Application No. PCT/US2010/044622, dated May 2, 2011, 10 pages.

ISA/KR, PCT International Search Report and Written Opinion, Application No. PCT/US2010/044623, dated Apr. 27, 2011, 10 pages.

ISA/KR, PCT International Search Report and Written Opinion, Application No. PCT/US2010/044624, dated Apr. 21, 2011, 8 pages.

ISA/KR, PCT International Search Report and Written Opinion, Application No. PCT/US2010/044625, dated Apr. 21, 2011, 8 pages.

* cited by examiner

SYSTEM AND METHODS FOR WIRELESS BROADBAND DELIVERY OF DATA

CROSS REFERENCE TO RELATED APPLICATIONS

This application claims priority to provisional application No. 61/213,999 filed Aug. 6, 2009, entitled "Broadband Wireless Communication", by Michael Leabman, which is incorporated by reference herein for all purposes.

Further, this application claims priority to provisional application No. 61/272,001 filed Aug. 10, 2009, entitled "MAC and Antenna Optimizations for Long-Distance Wireless Communication", by Michael Leabman, which is incorporated by reference herein for all purposes.

Additionally, this application is related to co-pending application Ser. No. 12/830,326, filed Jul. 4, 2010, entitled "System and Methods for Simultaneous Wireless Broadband Communication Between Multiple Base Stations", by Michael A. Leabman, which is incorporated by reference herein for all purposes.

Additionally, this application is related to co-pending application Ser. No. 12/830,327, filed Jul. 4, 2010, entitled "System and Methods for Antenna Optimization for Wireless Broadband Communication", by Michael A. Leabman, which is incorporated by reference herein for all purposes.

Additionally, this application is related to co-pending application Ser. No. 12/830,328, filed Jul. 4, 2010, entitled "System and Methods for Scalable Processing of Received Radio Frequency Beamform Signal", by Michael A. Leabman, which is incorporated by reference herein for all purposes.

Additionally, this application is related to co-pending application Ser. No. 12/830,329, filed Jul. 4, 2010, entitled "System and Methods for Media Access Control Optimization for Long Range Wireless Communication", by Michael A. Leabman, which is incorporated by reference herein for all purposes.

BACKGROUND

The present invention relates to data delivery systems and methods. More particularly, the present invention relates to systems and methods for delivering data content over unlicensed radio frequency (RF) spectrum between airborne platform and surface base stations. In some embodiments, this data delivery system may provide data at high throughput data rates exceeding 100 Mbps to enable the transfer of a wide variety of safety, operational and passenger data.

Communication and information access is imperative to the aviation industry. Earliest commercial aircrafts had primitive voice communication with ground personnel over two way shortwave radio. Not only did this communication dramatically improve flight safety, it also enabled accelerated commercialization of air transport on a level not previously known.

Since then, airborne platform have been further upgraded with advent of radar, computers, and even data links to further improve communications. These technologies serve to improve in-flight safety and provide amenities to passengers. However, true broadband high-throughput data uplinks are typically lacking for the airline industry. This is due to a combination of technical and financial constraints which have historically made it impractical, or even impossible, to supply high bit rate data connectivity to an entire fleet of commercial airliners.

However, regardless of hurdles, there is a need to enable broadband wireless communication for airborne platform. This need may generally be broken down into operational needs (i.e., maintenance and repair), air safety needs, and passenger generated needs.

Operational (maintenance) needs are driven by cost savings the airline may recapture by knowing, real-time, the condition of the airborne platform. Gigabytes of flight data are accumulated for each flight but are not easily accessible until after the airborne platform has landed (or are even totally inaccessible if not stored or later retrieval). This renders real time engine trends, fuel consumption rates, and parts performance variances unavailable for timely repairs and cost savings. Some of this data is often discarded because downloading the data currently is too slow or too expensive. In newer aircrafts, such as the Boeing 777 or the Airbus 380, some such operational data may be provided on a real time basis to ground personnel in some cases; however, this data is often limited and relies upon low bit rate speeds. Generally, important operational data is collected and downloaded via a wired access port when the airborne platform has landed. This data collection, however, is not real time data, and cannot be utilized to preplan maintenance needs.

Safety needs include the ability to identify causes and possibly prevent disastrous accidents. Currently, the flight recorder (i.e., "Black Box") of an airborne platform is accessible after a airborne platform crash. A Cockpit Voice Recorder (CVR) is an audio recorder which is often very useful in identifying causes of the accident. Further, depending upon crash location, the flight recorder and/or CVR are often never found. Without the flight recorder and/or CVR, it may be impossible to determine what caused the crash. Besides satisfying public curiosity and aiding the bereaved, this causal data is very important in generating protocols and/or safety inspections to prevent future similar accidents. Likewise, if critical airborne platform conditions were known by ground personnel in real time, potential disasters could possibly be identified and addressed before they happen. These safety needs are currently unmet given current limited data bandwidth to aircrafts.

Lastly, there are a number of passenger generated needs for larger data bandwidth. For example, unfettered Internet access for passengers could generate high advertising revenues. Likewise, high-speed Internet surfing would facilitate more passenger purchases and commissions for airlines. The limited internet access currently offered by airlines discourages use due to its slow speeds and relative cost.

Those airborne platform that are equipped to provide Internet access, or data communication, typically do so at little more than dial-up speeds. This is due, as stated earlier, to current technological and financial hurdles. One simple approach would be to purchase licensed radio frequency (RF) spectrum to devise a dedicated surface to airborne platform communication network. However such a system would requires substantial spectrum to service an airline fleet and is thus financially prohibitive. For example, it is expected that 160 MHz of spectrum would be required to achieve the desired performance. A recent purchase by Verizon of 14 MHz cost the company between one and two billion dollars. Of course some spectrum is more valuable than others depending upon services envisioned. Cellular and close to cellular spectrum is considered prime spectrum real estate. Regardless, the purchase of the necessary licensed RF spectrum would require an exorbitant capital investment extending to several billions of dollars.

Other approaches to providing data connectivity to aircrafts are to install Satellite Ku Band or Cellular receivers.

The weight of a Satellite system is roughly 450 pounds. A cellular system may weigh less, but is still a substantial 125 pounds of excess weight. Weight in an airborne platform is directly related to further fuel consumption. Thus, these systems may cost the airline a lot over the course of their usable lifetimes.

In addition to fuel costs, the units themselves are costly. The cellular system has a substantial cost in the neighborhood of one hundred and twenty five thousand dollars upfront per airborne platform. The cost for a satellite system may be even larger at around four hundred and fifty thousand dollars. Additionally, the cost of maintenance for the satellite system may tack on an additional hundred thousand dollars or so per year per airborne platform, and the array on the airborne platform may, in some cases, extract a substantial aerodynamic penalty.

Additionally, the operational costs of these devices may be very large based upon the size of data being transmitted. It may be costly to send sizable data over satellite or cellular systems.

Lastly, the data rates for common, shared service commercial systems are still relatively low; satellite operates at roughly 1.5 Mbps per airborne platform, and Cellular systems operate between 0.25 and 2.0 Mbps. Further, signal reliability may be of issue for cellular systems. Likewise, satellite bandwidth may be overwhelmed by sudden surges in data download demand, such as may occur if a large number of passengers on a number of airborne platform start data intensive downloads.

Thus, data must be limited in these cases to the point where only a fraction of the above noted needs are capable of being met. For example, the time needed to download a two hour movie may exceed three hours given these technologies. Thus, the existing technologies for data transfer to a airborne platform are woefully inadequate to meet the airlines' needs, even when the funds are available to implement them.

In view of the foregoing, systems and methods for long distance wireless delivery of data are disclosed. The present invention provides a novel system for providing data to or from aircrafts at unprecedented data rates, and in a cost effective manner.

SUMMARY

The present invention relates to an airborne data delivery system. More particularly, the present invention teaches systems and methods for airborne broadband wireless delivery of data. The data delivery system, in some embodiments, may be utilized to provide high speed data transmission to airborne platform over a long distance in a cost effective manner.

In one embodiment, the system and method for wireless data delivery may utilize one or more antenna arrays. Some such antenna arrays are located on airborne platforms (such as aircraft) and others may be present at or adjacent to surface base stations. In some cases one of the antenna arrays may generate a plurality of directional synchronization beams. These directional synchronization beams are directed in at a plurality of corresponding spatial directions. The direction of beam projection may depend upon random or deterministic perturbations of base signals, in some embodiments. Further, directional synchronization beams may be transmitted in series over a time period, or may be of different frequency groups and therefore capable of simultaneous transmission.

Other antenna arrays receive the directional synchronization beam and respond in kind. The original antenna array may then receive the response and use it to determine directionality of a base station (or other antenna arrays) from the response.

The antenna arrays may then undergo training to improve signal fidelity. This may include the antenna array receiving a training beam. The training beam includes known data, such as a Fourier Matrix, in some embodiments. The received known data may then be utilized to generate weights.

These weights may then be utilized to modify either of the phase or amplitude of a base signal which is then sent to each of the elements of the antenna array. By modulating phase and/or amplitude of the signals driving some elements directionality of the signal propagation may be achieved (beam forming). Thus, a directional beam may be formed which is directed toward any desired direction, and in the case of the training weights, may be oriented toward the source of the training beam, which may be a base station or the like.

It may also be desirable to identify sources of interference. Interference sources are all non-desired sources of radiation within the target frequency range. In order to perform this identification, the antenna array may identify all radiating sources. Those which are emitting a beamform (desired signals) may be removed from the list of identified radiating sources. Those left are considered interference sources. Lastly, the system may steer one or more nulls in order to substantially attenuate the sources of interference.

Note that the various features of embodiments of the present invention described above may be practiced alone or in combination. These and other features of various embodiments of the present invention will be described in more detail below in the detailed description of the invention and in conjunction with the following figures. Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
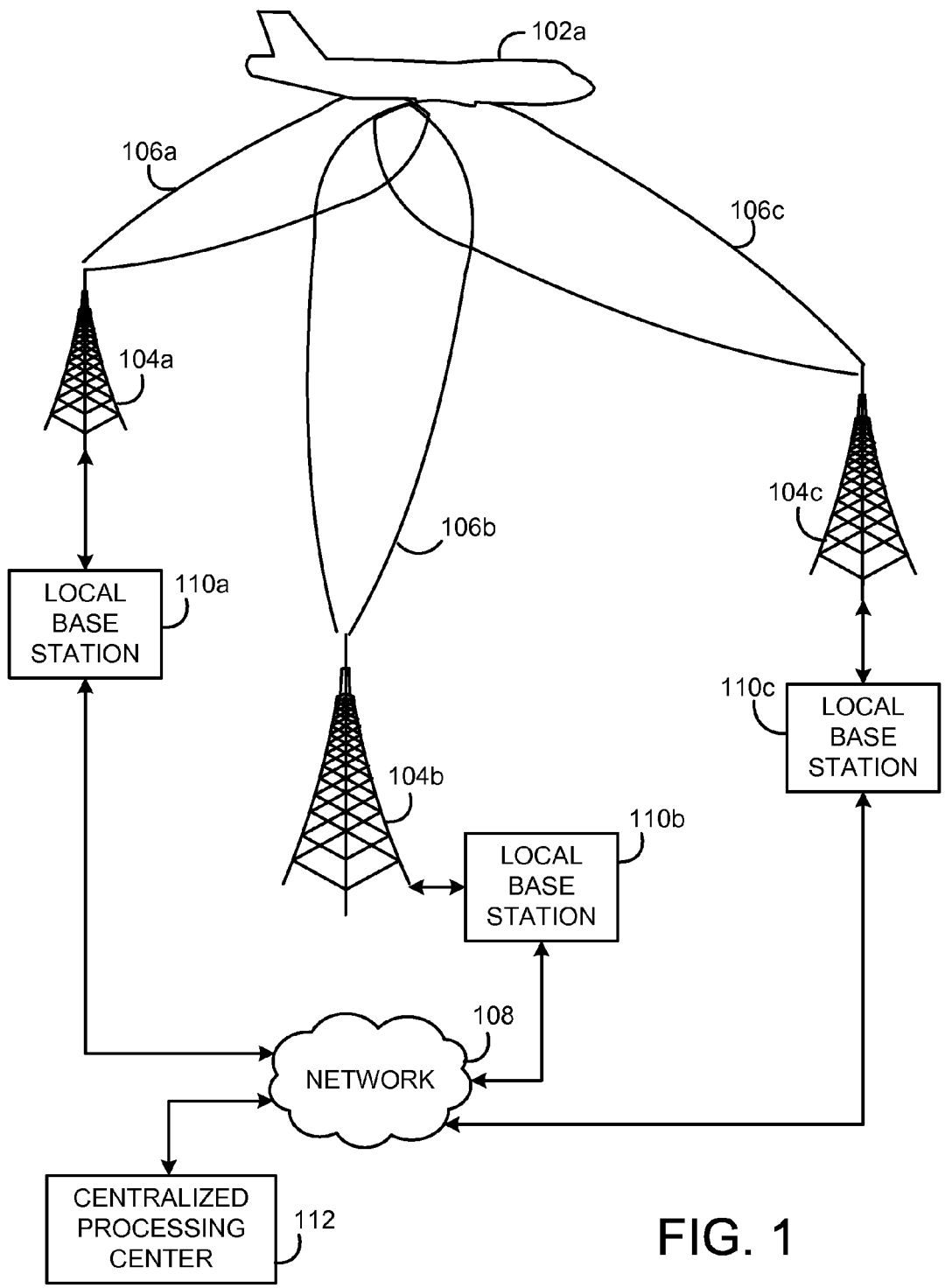
FIG. 1 is an example illustration of an airborne platform in wireless broadband communication with a plurality of surface based antenna arrays coupled to base stations, in accordance with some embodiments.

The present invention will now be described in detail with reference to selected preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

As previously disclosed, in order to provide a system that is capable of meeting the load demands of the airline industry, and not be prohibitively expensive, a number of conditions must be met. These include utilization of unlicensed spectrum in some embodiments, sufficient data throughput, and sufficient range. In other embodiments, licensed radio spectrum is also considered a viable medium for use by the broadband wireless communication system.

In order to meet these requirements at reasonable costs, some embodiments relating generally to systems and methods for long range wireless delivery of data over Radio Frequency (RF) spectrum are provided. In some embodiments, it may be desirable to utilize unlicensed spectrum for the system for cost saving purposes. Unlicensed spectrum in the United States includes spectrum centered around 2.45 GHz and 5.8 GHz, for example. These regions are under the jurisdiction of the Federal Communications Commission (FCC). The FCC regulation Part 15 (47 CFR §15) dictates how unlicensed spectrum may be utilized, including a power envelope that any device operating in this spectrum must comply with.

The FCC Part 15.247 restricts power to 1 watt EIRP with a 6 dBi Antenna. As antenna gain increases, the total allowed EIRP must be lowered according to the part 15.247 spec. For example, below is provided a table overview of some of the current regulations of FCC Part 15:

TABLE 1

| Permissible under Part 15: | FCC Part 15 | | |
|---|---|---|---|
| | Max. Transmitter RF power | Ant. gain (dBi) | EIRP (W) |
| 900 MHz | 30 dBm (1 W) | 6 | 3.98 |
| 2.4 GHz omni-directional | 30 dBm (1 W) | 6 | 3.98 |
| 2.4 GHz directional | 29 dBm (800 mW) | 9 | 6.35 |
| | 28 dBm (640 mW) | 12 | 10.14 |
| | 27 dBM (500 mW) | 15 | 15.81 |
| | 26 dBm (400 mW) | 18 | 25.23 |
| | 25 dBm (320 mW) | 21 | 40.28 |
| | 24 dBm (250 mW) | 24 | 62.79 |
| | 23 dBm (200 mW) | 27 | 100.2 |
| | 22 dBm (160 mW) | 30 | 160.0 |
| 5.15-5.25 GHz | 16 dBm (40 mW) | 0 | 0.16 |
| 5.25-5.35 GHz | 23 dBm (200 mW) | 6 | 0.80 |
| 5.725-5.825 GHz omni-directional | 30 dBm (1 W) | 6 | 3.98 |
| 5.725-5.825 GHz directional+ | 30 dBm (1 W) | 28 | 630.9 |

While the some embodiments utilize unlicensed radio spectrum, it is also considered within the scope of some embodiments that other surface wireless signal may likewise be utilized for transmission of data in this manner, such as licensed radio spectrum.

In some embodiments, the usage of beamforming on the radio spectrum is utilized to achieve the necessary range and data transfer rates needed. In addition, by null steering, potential interference sources may be ignored. This enables a system with higher fidelity, range, and data rates for substantially less capital investment than satellite or cellular systems.

The broadband wireless communication system 200 may be used to provide a data communication link to airborne platform 102a and 102b. This link may be used to provide data networking for multiple users located on the airborne platform. For example, the airborne platform 102a may use a device to communicate with one or more base stations 110a. This connection may then be shared with a variety of users including passengers on board the airborne platform 102a and 102b.

This broadband wireless communications link may be used for a wide variety of services including one or more of the following, alone or in any combination: airborne platform entertainment, such as, for example, audio and/or video streaming, Internet access, on-demand movies, and the like; airborne platform security system operation, such as, for example, streaming real-time cockpit/passenger cabin video and/or audio to/from the surface, flight tracking, communications between flight crews and the ground, and the like; providing information services, such as, for example, integrating a terminal wireless system (i.e., the same system that downloads content at the gate); travel-related services (such as hotel, car, restaurant, and/or flight reservations); high-speed Internet access for airborne platform passengers; and so on.

Furthermore, a single communication link to surface may be shared with other systems on the airborne platform 102a and with passengers using any data networking technology, including a WiFi network, Ethernet connections, and the like. Services may be hosted on the airborne platform 102a using this data networking technology either alone, or in combination with the surface communication link. For example, in some embodiments, the airborne platform 102a may include a gaming server that is activated upon entering airspace that is not subject to gaming laws and regulations. In this manner, passengers may access the gaming server and place wagers, play casino-like games (e.g., slot machines, blackjack, video poker, and the like). In some embodiments, the communication link is used, for example, to verify financial information, to transfer money, and the like. Some implementations use PayPal or other Internet payment service to effect such transfers.

Note that in the remainder of this application, particular attention will be placed upon transmission of data to and from an airborne platform. It is intended, however, that some embodiments be adapted for use for a wide variety of long range data transmission applications. For example, the provided long range wireless communication system and methods may be equally well suited for use in maritime applications such as cargo and cruise ships, for locomotive data transfer, such as cargo, commuter and high speed trains and/or for stationary data locations, such as off-grid homes or the like. Stationary and mobile surface platforms, e.g., ground stations, ships, trains, can communicate with each other via public and/and private networks such as the Internet and POTS, and combinations thereof. These networks can be implemented using wired and/or wireless links such as microwave or shortwave links, and combinations thereof. In addition to long-range air to/from ground wireless communications, exemplary embodiments described in detail below, the present invention may also be adapted to ground to ground wireless communications.

The following description of some embodiments will be provided in relation to numerous subsections. The use of subsections, with headings, is intended to provide greater clarity and structure to the embodiments. In no way are the subsections intended to limit or constrain the disclosure contained therein. Thus, disclosures in any one section are intended to apply to all other sections, as is applicable.

I. Wireless Broadband Data Delivery

Figure 2:
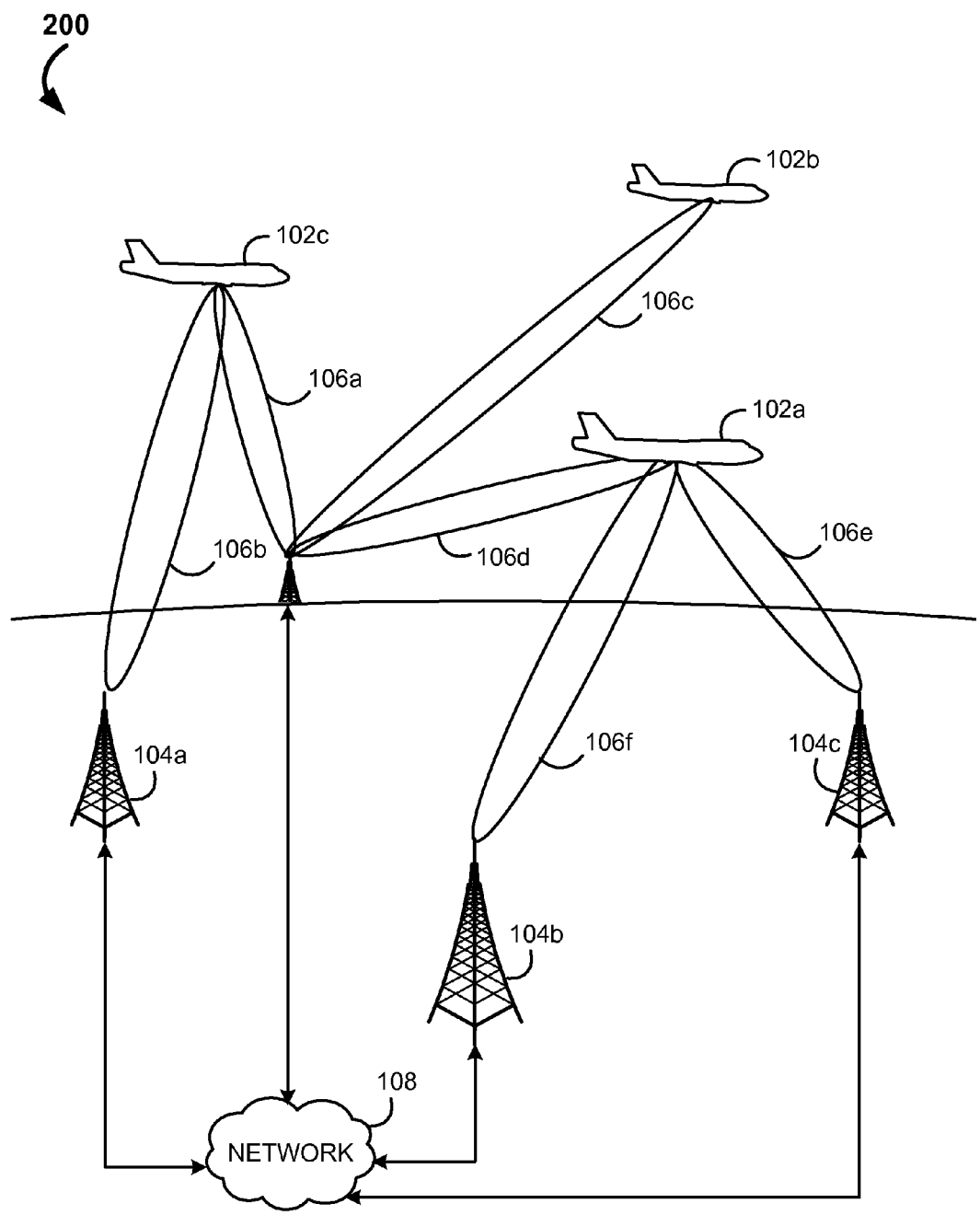
FIG. 2 is an example illustration of more than one airborne platform in wireless broadband communication with a plurality of surface based antenna arrays, in accordance with some embodiments.

In some embodiments, at FIGS. 1 and 2, a broadband wireless communication system 200 enables data communication with one or more Airborne platform 102a, 102b and 102c. Airborne platform 102a, 102b and 102c communicate with one or more Antenna Arrays 104a, 104b, and 104c across a wireless link 106a, 106b, 106c, 106d, 106e and 106f. In some embodiments, the wireless link 106a, 106b, 106c, 106d, 106e and 106f may include directional signal propagation generated from phased antenna arrays 104a, 104b, and 104c. Such a technique is known in the art as "beamforming" and will be discussed in considerable detail below.

Adaptive signal processing, such as that utilized for the beamforming discussed in this application, uses an array of elements, and has long been a solution to the problem of combating interference signals in communication systems. However, with the introduction of compact, inexpensive digital computers, and novel and sophisticated protocols, it is now feasible to implement more complicated results from detection and estimation theory. These results enable adaptive array systems which are capable of adjusting and responding to rapid changes in the signal environment. As a consequence, these systems have much greater flexibility, reliability, and improved reception over prior adaptive array systems.

Where common filter techniques using one element have proven to be effective when frequencies of interest differ from the frequencies of interference signals, adaptive array algorithms are required when the spectrum of interference signals and the desired signal overlap. An adaptive array has the ability, when properly implemented, to automatically sense and separate signals and interference noise from different directions without prior knowledge of the environment. Further, adaptive arrays may be utilized in conjunction with other interference reduction techniques, thus achieving a reduction in interference at a greater level than could be achieved using any one method.

In conventional communication systems, a direct sequence spread spectrum system is often utilized, modulating the communication signal with a pseudonoise (PN) signal and later dispreading it with the original known PN sequence. While this conventional method can reduce interference, it is limited by the length of the PN sequence. The longer the PN code, the greater the ability to separate the signal from interference noise. However, since longer PN sequences also result in longer transmission delays, the length of the PN code, and thus the ability to cancel noise, is often limited. As this is frequently the case, another method, such as an adaptive array system, is often implemented in conjunction with the spread-spectrum approach when further interference attenuation and greater channel capacity is needed.

While classical adaptive array methods have proven to be very effective for cancellation of interference signals, they are still plagued by several severe limitations. The ability of such a system to cancel interference signals is strongly influenced by the arrival angle and bandwidth of the interference signals. To alleviate these problems, an adaptive system, one which applies multiple frequency-dependent weights to each array element rather than just one weight to each element, may be utilized in order to achieve numerous benefits over the older, more classical approaches. This approach known as adaptive band-partitioning, divides the frequency spectrum into multiple narrow frequency bins, and then performs spatial cancellation on each bin. The primary advantage of this approach is the ability to cancel interference signals of appreciable bandwidths. Furthermore, the system also has the ability to cancel a greater number of narrowband interference signals. While the classical approach is capable of attenuating N−1 narrowband interference signals, N being the number of antenna elements in the array, the new proposed system has the ability of attenuating N−1 narrowband interference signals in each frequency bin.

Each Airborne platform 102a may include its own wireless communication system including an antenna array 104a and processing capabilities. Further, the Airborne platform 102a may function as a platform for additional mobile devices, such as media players, gaming systems, video devices and the like.

The surface based Antenna Arrays 104a, 104b and 104c are coupled to a Local Base Stations 110a, 110b and 110c, respectively. Each Base Station 110a, 110b and 110c may supply the processing requirements for directional data transmission at the Antenna Arrays 102a, 102b and 102c, as will be described in greater detail below.

The Local Base Stations 110a, 110b and 110c may be connected to a network 108, such as, for example, the Internet. Connection of the Local Base Stations 110a, 110b and 110c to the Network 108 may be accomplished via a wired connection, wirelessly (i.e., radio signal, microwave signal, etc.), or through any reasonable combination. Three base stations 110a, 110b and 110c are shown in FIGS. 1 and 2; however, any number of base stations 110a, 110b and 110c may be used. For example, a high-capacity system covering the continental United States may include approximately 50-500 base stations 110a, 110b and 110c and Antenna Arrays 104a, 104b and 104c strategically located based on customer utilization and demands. Of course more or fewer base stations may be utilized depending upon infrastructure and saturation requirements.

The Network 108 may also couple to a Centralized Processing Center 112 which may provide greater coordination of Base Station 110a, 110b and 110c management. Likewise, the Centralized Processing Center 112 may likewise collect and host information and data for the airborne platform.

A broadband wireless communication system enabling broadband wireless communications with airborne platform 102a and 102b can be implemented using cellular, sectorized Antenna Arrays 104a, 104b and 104c that are tied to a network 108 via Base Stations 110a, 110b and 110c, such as, for example, the public switched telephone network ("PSTN"), a private network, the Internet, and the like. Antenna Arrays 104a, 104b and 104c frequency allocations may be made according to widely known techniques used in mobile telecommunications; however, an airborne platform flying only 10,000 feet in the sky has line-of-sight radio coverage of over 120 miles in every direction. Accordingly, an airborne platform is likely to be capable of line-of-sight communications with multiple Antenna Arrays 104a, 104b and 104c. Furthermore, two airborne platform 102a and 102b flying at 10,000 feet may be able to conduct line-of-sight communications over a distance of 240 miles. As altitude increases, the aircrafts' 102a and 102b line of sight communications range increases.

To improve the spectral efficiency of the broadband wireless communication system, it is desirable to use directional antennas. Directional antennas use multiple antennas in each Antenna Array 104, each antenna is fed the same foundation signal but that signal is altered for some antennas by changing the phase and sometimes both phase and amplitude to generate directional transmissions. This spatial selectivity is achieved by using adaptive or fixed receive/transmit beam patterns. This is known in the art, as noted above, as beamforming. Beamforming may be utilized to send data signals a large distance to the target with considerable effective power (gain).

Traditionally, beamforming has been limited in its effectiveness. For example, the use of beamforming on rapidly moving devices, such as an airborne platform, is known to be difficult due to Doppler Effects. Likewise, the added benefit in gain by utilizing beamforming is not realizable in traditional systems because in these systems the ability to synchronize the two communicating antenna arrays is limited to the coverage area of a single antenna transmitting in an omnidirectional fashion.

Embodiments overcome these technological hurdles by enabling beamform synchronization protocols, enhanced handling of Doppler Effects, null steering and other means of enabling efficient and effective usage of a beamforming data communication system in conjunction with airborne platform.

In some embodiments, the surface based antenna array 104a may include four or more antennas. Likewise, the antenna array located at the airborne platform may consist of four or more antennas. This may be contrasted with typical WiMAX and LTE systems which merely employ two antennas on the receiving end, and a single antenna for transmission. In this embodiment, all four of the array antennas are utilized for both transmission and receiving. Note that surface based includes any surface based, or sea based system. Further a surface based system may be stationary, such as an installation base station, or mobile, such as a base station on a ship or locomotive.

Having four antennas enables the arrays to project four beamforms, exhibit four distinct desired nulls, or a combination thereof as will be described in greater detail below. Of course, in other embodiments, more or fewer antennas may be included in the arrays on the surface and on the airborne platform. Note that a system, such as that described in this embodiment, may have a functional range of over 100 miles with data rates of 100 Mbps entirely as a consequence of antenna performance without an increase in delivered power to the antenna.

Further, while in some embodiments the airborne platform antenna array has the same number of antennas as the surface based array 104a, it is considered that different number of antennas may be utilized by each array as is desired. For example, in a crowded region in which a large number of airborne platform travel, such as near an airport, it may be desirous for the surface based antenna arrays to include more than four antennas, as this enables the array to generate a larger number of beams, thereby enabling the surface array 104a to maintain communication with more airborne platform at a time.

An additional benefit of some embodiments is the ability to form relatively narrow beamforms. In some cases these beams may achieve nearly 5-10 degrees of coverage. This means that for any given antenna array 104a there is theoretically up to 72 discrete non-overlapping directions of beamforming in the horizontal direction (360°/5°=72). Likewise, in the vertical direction there are up to 18 beams theoretically possible (90°/5°=18). Thus, at any given time, the three dimensional space existing around an antenna array 104a could, conceivably, be segmented into 1296 discrete, non-overlapping volumes given a beam width of five degrees (72×18=1296).

As beam width increases, however, the coverage of the area around the antenna array 104a becomes less granular. For example, for beamforms of 10 degree coverage, there are theoretically 36 discrete non-overlapping directions of beamforming in the horizontal direction, and only nine in the vertical direction. This results in a far fewer 324 discrete, non-overlapping volumes around the antenna array 104a. Thus, even though the beam coverage is simply double that of a narrow five degree beam, there are four times fewer volumes individually perceivable around the antenna array 104a.

Figure 14:
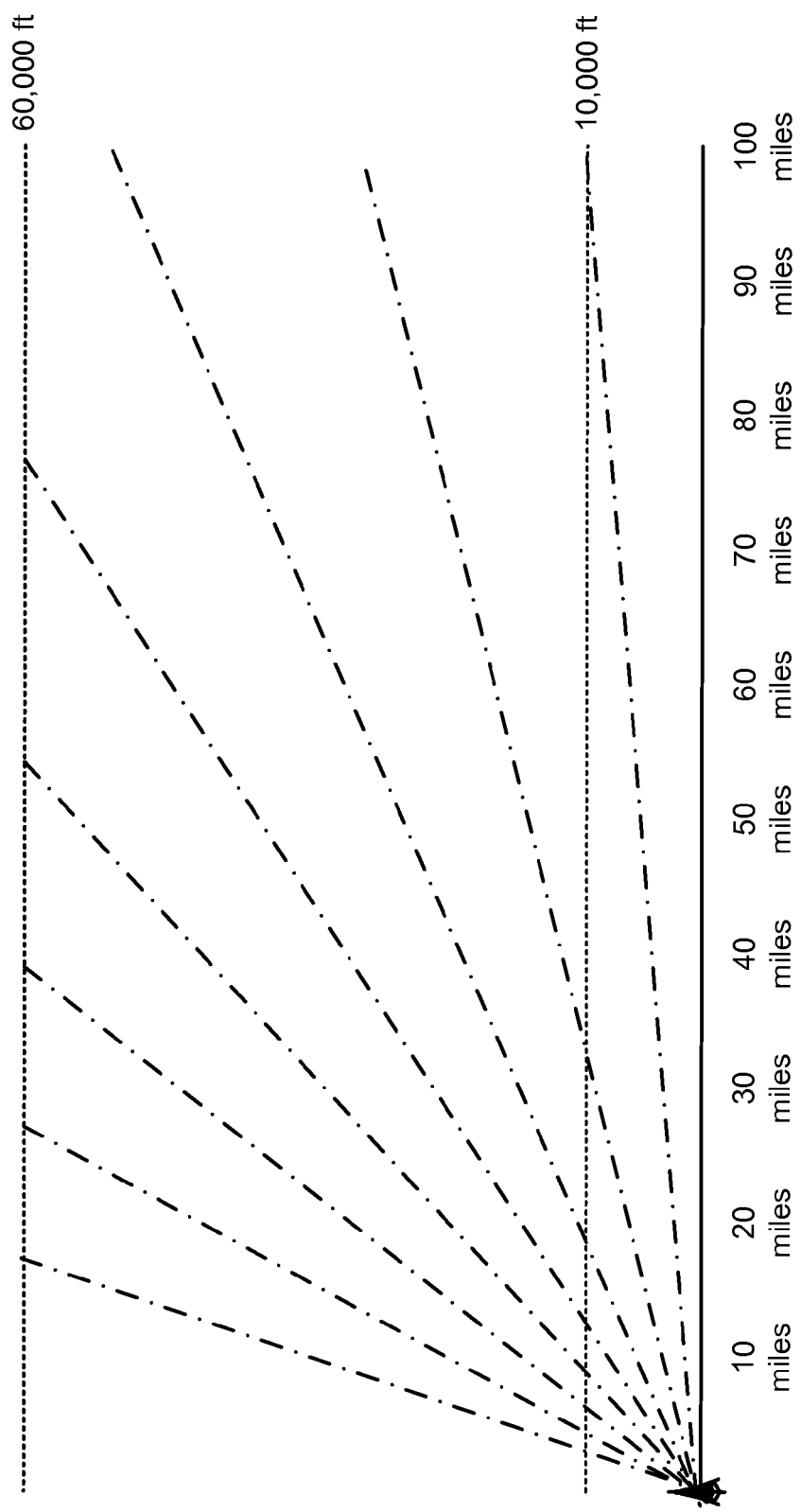
FIG. 14 is an example illustration diagram of the vertical airspace around an antenna array in accordance with some embodiments.

Turn briefly to FIG. 14 which illustrates a vertical area of airspace around an antenna array 104a. Here distance from the array 104a is shown to 100 miles. Likewise, vertical altitude is shown between 10,000 feet and 60,000 feet. Typical airborne platform travel at altitudes between 10,000 feet and 60,000 feet under normal conditions. Note that the present illustration is not to scale to provide greater readability.

Also illustrated at this example, figure is a segmentation of the area in the vertical direction by ten degree increments. Thus, it is illustrated how the vertical area is divided into discrete, non-overlapping areas. Now, envision looking directly down upon the antenna array 104a. The array would be visible as a point at the center of a 100 mile circle prescribing the range of the antenna array 104a. This horizontal area may be sectioned by beamform coverage angles, in this example by 10 degree increments, like a pie. Combining this pie image with the vertical areas illustrated by FIG. 14 provides an approximation of the number of discrete volumes (i.e., granularity) of coverage that the given array 104a is capable of producing.

As airborne platform 102a, 102b and 102c fly, the relative direction from the airborne platform 102a, 102b and 102c to the base stations' antenna array 104a, 104b and 104c changes. Accordingly, it is desirable to be able to change the direction in which RF emissions radiate. Many such techniques are known in the art, for example, one or more directional antennas may be used. These directional antennas may be mechanically positioned to transmit in the desired direction. Alternatively, a set of directional antennas may be used, with a transceiver switching between the available antennas to select a suitably-oriented antenna. Further, in some embodiments, a smart antenna array 104a is used to dynamically vary directivity of transmission and/or reception.

In some implementations, some of the base stations 110a, 110b and 110c may not have direct connections to the network 108. For example, if base station 104a is deployed in a remote location where Internet access is expensive, unreliable, inconvenient, or otherwise undesirable, the base station 110a may instead be deployed with a wireless link to the network 108. This wireless link may be implemented using the broadband wireless techniques disclosed herein or using any other data communications technology now known or later developed.

In one implementation, the base stations 110a, 110b and 110c are connected to the network 108 through one or more of the following: (i) a wireless communications link using the same spectrum and technology as wireless links 106a, 106b, 106c and 106d; (ii) parabolic microwave signaling; (iii) the internet; (iv) the public switched telephone networks ("PSTN"); (v) a private network; and (vi) any combination thereof. Additionally, in most implementations, it is desirable to provide surface-based base stations 104a, 104b and 104c; however, the systems and techniques described herein would be equally applicable to a system using one or more airborne base station 104a, 104b and 104c. For example, a base station 104a, 104b and 104c may be used as an airborne mobile command center.

As noted previously, for purposes of example, airborne platforms 102a and 102b are referenced as mobile devices for purposes of example only. One skilled in the art will appreciate that the systems and techniques described herein are equally applicable to other fixed and mobile devices. For example, the techniques described herein may be used to enable broadband wireless data communications for automobiles, marine vessels, trains, and the like.

In some embodiments, it may be desirable for the radio system to have the ability to switch between multiple power sources. For example, a radio device in an airborne platform may be configured to switch between a battery backup, and an at-gate power source.

Figure 9:
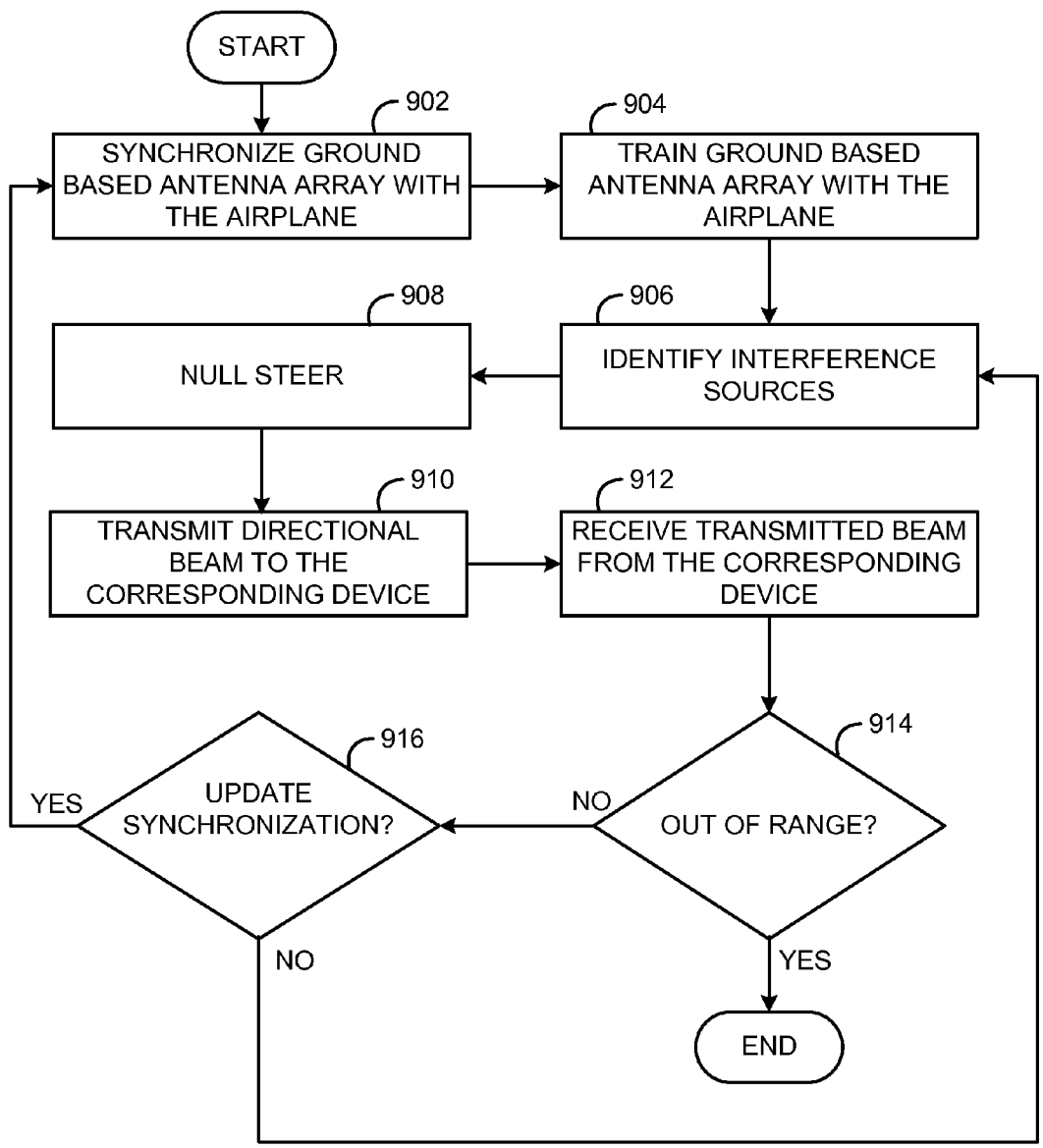
FIG. 9 is an example flowchart diagram for the process of delivering data over a wireless broadband data delivery system in accordance with some embodiments.

Attention will now be turned to FIG. 9, where an example illustration of an embodiment of the process for wireless broadband communication is provided. As both the surface based antenna array 104a and the antenna array in the airborne platform 102a are equally capable of both transmission and receiving, the process as laid out in FIG. 9 may, in some embodiments, apply equally well to the system of the surface base station (with corresponding antenna array), or the mobile device within the airborne platform 102a.

The process begins by synchronization of the surface based Antenna Array 104a with the mobile Airborne platform 102a at step 902. Synchronization is itself a well known process. However, given the power restraints the current system is operating under, as well as the great distance between the airborne platform 102a and the antenna array 104a, traditional synchronization protocols are woefully inadequate. Instead the system approaches the issue of synchronization with a novel method whereby randomized, or deterministically generated, beamforms containing synchronization data are transmitted in a multitude of directions. This process and systems for synchronization of the airborne platform's communication system and that of the surface based antenna array 104a will be described in more detail below in relation to FIGS. 10A and 10B.

After synchronization the process progresses to step 904 where training of the communication system is performed. Training is required to properly generate beamforms with correct directional signal propagation in order to reach the intended target. During training known symbols or pilots are transmitted and utilized by the receiver to generate weights for antenna amplitude and phase shifts in order to generate the proper beamform to respond to the original transmitter device. Training will be discussed in more detail below in relation to FIG. 11.

After training is performed, the system may identify sources of interference, at step 906. Interference sources may include other devices operating within the same or similar frequency range. Since, in some embodiments, the system is operating in crowded radio spectrum, a multitude of devices may emit radio signals within the same frequency range. For unlicensed spectrum these could include Wi-Fi access points, cordless phones, microwaves, remote control devices, microwave ovens, and the like. These devices tend to be low powered devices, therefore only relatively close devices are typically considered sources of interference.

In addition to external devices being sources of interference, other surface based antenna arrays and airborne platforms may be sources of unwanted signals. The process may block all these sources of interference through null steering, at step 908. As noted before, in addition to generating a beamform, one or more null spaces may be generated with an antenna array 104a. These null spaces may be oriented in order to "block out" the interference sources. Null steering will be described in more detail below in relation to FIGS. 3 and 12.

After the generation of a null space, the process may progress to step 910, where a directional beam may be transmitted (i.e., beamforming) to the receiving device. As noted, beamforming may be accomplished through the selective weighing of amplitude and phase shifting of the signal provided to each of the antennas within then antenna arrays. Weights, as noted above, are calculated for each antenna during the training step. In addition to transmitting data via a beamform, the antenna array 104a may likewise receive data at step 912. Details of beamform transmission and receipt will be discussed below in greater detail.

Note that beamformers can be classified as either data independent or statistically optimum, depending on how the weights are chosen. The generation of weights, in some embodiments, is discussed above in some detail in relation to system training processes. The weights in a data independent beamformer do not depend on the array data and are chosen to present a specified response for all signal/interference scenarios. The weights in a statistically optimum beamformer are chosen based on the statistics of the array data to "optimize" the array response. In general, the statistically optimum beamformer places nulls in the directions of interfering sources in an attempt to maximize the signal to noise ratio at the beamformer output.

After transmission and receipt of data, the process continues to step 914 where an inquiry is made whether the airborne platform 102a and the surface based base station are out of range. If so, the process ends. Typically, this occurs as the airborne platform 102a flies beyond the coverage area of the surface based antenna array 104a. In most cases the airborne platform 102a in communication with more than one surface based antenna array 104a, thereby enabling the airborne platform 102a to experience seamless data communication as it enters and exits the coverage areas of multiple surface antenna arrays.

If the airborne platform 102a is not out of range, however, the process continues to step 916 where an inquiry is made whether to update the synchronization between the base station and the airborne platform 102a. Synchronization updates are necessary because the airborne platform 102a is constantly moving rapidly. The coverage of a beamform is relatively limited. For example, beams could be as narrow as 5-10 degrees. Thus, as the airborne platform moves, it may pass through the beam coverage in approximately 20 milliseconds depending on the distance between the airborne platform 102a and the surface based antenna array 104a. Thus optimally, the synchronization may occur every 5 milliseconds, in some embodiments, in order to keep the directionality information for beams current.

In addition to using time since last synchronization event to determine if an update is necessary, particular events may trigger a synchronization update. These events may include loss of contact between the airborne platform 102a and the surface antenna array 104a, signal degradation, and the like. If synchronization update is desired, the system may then return to step 902 where the synchronization process is repeated. Otherwise, if synchronization updates are not required, the process may instead return to step 906 where interferences are identified.

Below is provided a number of subsections detailing the individual sub-processes of the long range, wireless, broadband data communication as described at FIG. 9. Note that the provided subsections are intended to describe particular embodiments. Additional methods may be employed to accomplish some of these sub-processes, and it is entirely within the scope of the invention to utilize any logical permutations or alternative processes to complete the wireless broadband data delivery.

A. Synchronization of the Airborne Platform with Surface Antenna Array

The synchronization of the surface based antenna array 104a with the mobile device housed at the airborne platform 102a, as indicated at step 902 of FIG. 9, will now be discussed in greater detail.

In some embodiments of the broadband wireless communication system, a single mobile device 102a is capable of directly communicating with multiple base stations 110a via an Antenna Array 104a. In conventional wireless communication systems, Antenna Arrays 104a periodically transmit synchronization signals on a single antenna in all directions. An omnidirectional transmission allows the base station 110a to synchronize with a mobile device in an airborne platform 102a regardless of its position. If the base station 104a instead transmitted signals using beamforming, those mobile devices 102a falling within a null of the Antenna Array's 104a transmission would not be able to synchronize with the base station 110a.

However, in the context communicating long distances with an airborne platform 102a, it is possible that an omnidirectional synchronization transmission by either the airborne platform 102a or the base station would not reach the opposing transceiver with enough power to be discerned over background noise. This may be particularly true if there are power restrictions in place on maximum antenna power levels. This is, again, in some embodiments, due to the power envelope restriction placed upon transmissions within this spectrum by the FCC. As noted, the communication between airborne platform 102a and base station requires the gain advantage of beamforming in order to operate in the unlicensed spectrum. Omnidirectional transmissions are simply too weak to span the distance with sufficient signal strength in order to perceivable by either the base station or the airborne platform's mobile device.

In order to overcome this power limitation, in some embodiments of the broadband wireless communication system, the Antenna Array 104a may transmit synchronization signals using at least two antennas of the array, using beamforming or other smart antenna technology to transmit synchronization signals over a greater distance and at greater gain. While this technique effectively transmits synchronization signals over greater distances, it also results in areas where synchronization signals are significantly diminished (e.g., in nulls).

In order to overcome this issue the system may, in some embodiments, transmit the beams in differing directions of signal propagation periodically. There are two basic approaches for modifying synchronization signals in order to differ direction of signal propagation: (i) random perturbation; or (ii) deterministic perturbation. Perturbation refers to changing the direction of the beam by altering the relationship of the signals driving the antenna elements.

Random perturbation is the modification of transmitted synchronization signals resulting in random variations of such signals. For example, one random perturbation technique is to randomly vary the phase of synchronization signals transmitted by one or more antennas of the base station antenna array 104a. For example, if four antennas are used for synchronization signal transmission, the signals being transmitted by one or more of the four antennas being used may be varied in some aspect (e.g., phase, amplitude, and the like) resulting in a likely change in the propagation of the synchronization signal.

Using deterministic perturbation, synchronization signals are varied in a manner other than random perturbation. For example, synchronization signals may be varied in a predetermined manner designed to move one or more beams so as to reduce the likelihood that a mobile device 102a would fall in a null and be unable to synchronize with the base station 104a. Any deterministic variance may be used, including, for example, varying synchronization signals a predetermined amount, varying characteristics (such as phase, amplitude, and the like) of synchronization signals transmitted by each antenna, etc.

In this way, the mobile device in an airborne platform 102a is likely to fall within at least one of the randomized, or deterministic, beams. Likewise, each mobile device would be unlikely to fall in a null for an unreasonable period of time.

Figure 10A:
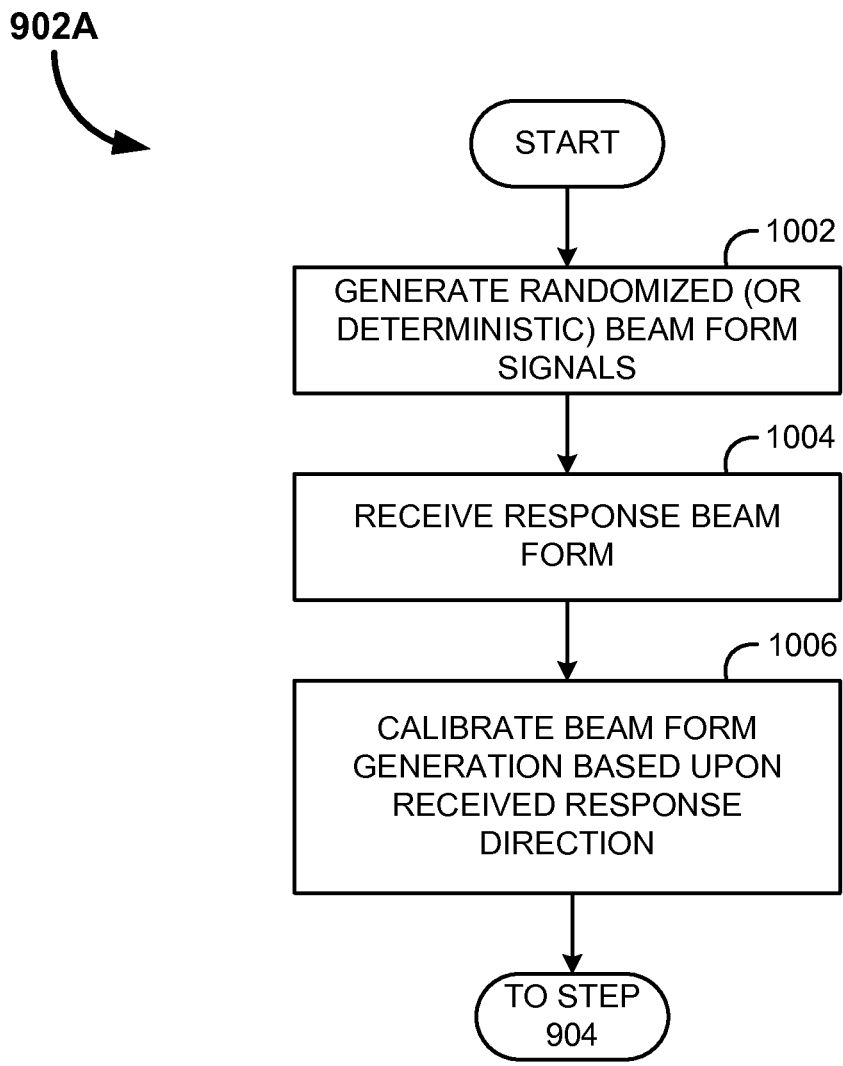
FIG. 10A is a first example flowchart diagram for the process of synchronizing a surface based antenna array with a mobile antenna array in accordance with some embodiments.

FIG. 10A illustrates one embodiment of the process of synchronization utilizing randomized or deterministic beamform perturbations across a time domain, shown generally at 902A. This process begins at step 1002 where randomized or deterministic beamform perturbations are generated. The beamforms are then sequentially transmitted with these differing directional signal propagation paths. The system then waits for a return transmission at step 1004. The return response may then be utilized to calibrate, at step 1006, the generation of future training transmissions.

The system may exhibit symmetrical behavior, as well; a mobile device located on an airborne platform 102a may search for base stations in the same manner. In these embodiments, the airborne platform 102a may send out randomized, or deterministic, beams in hopes of reaching a base station.

Figure 4:
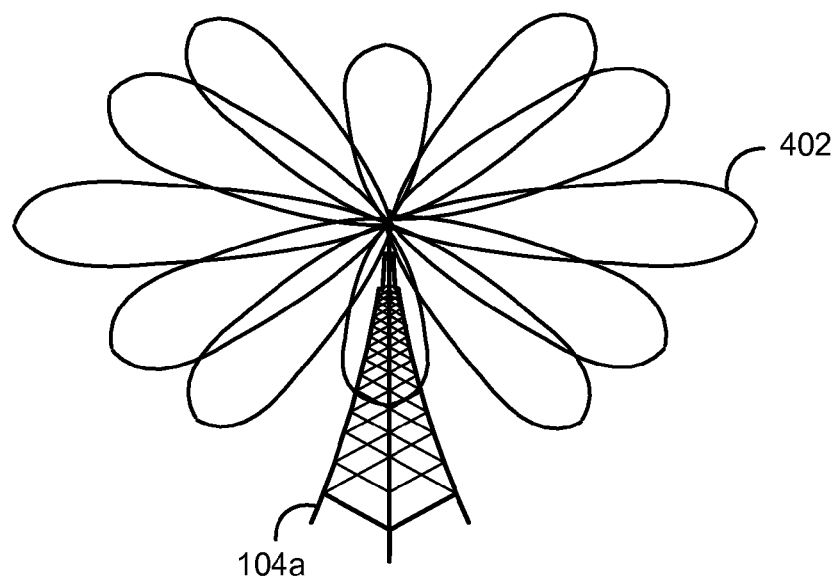
FIG. 4 is an example illustration of an antenna arrays projecting a number of synchronization beamforms, in accordance with some embodiments.
Figure 5:
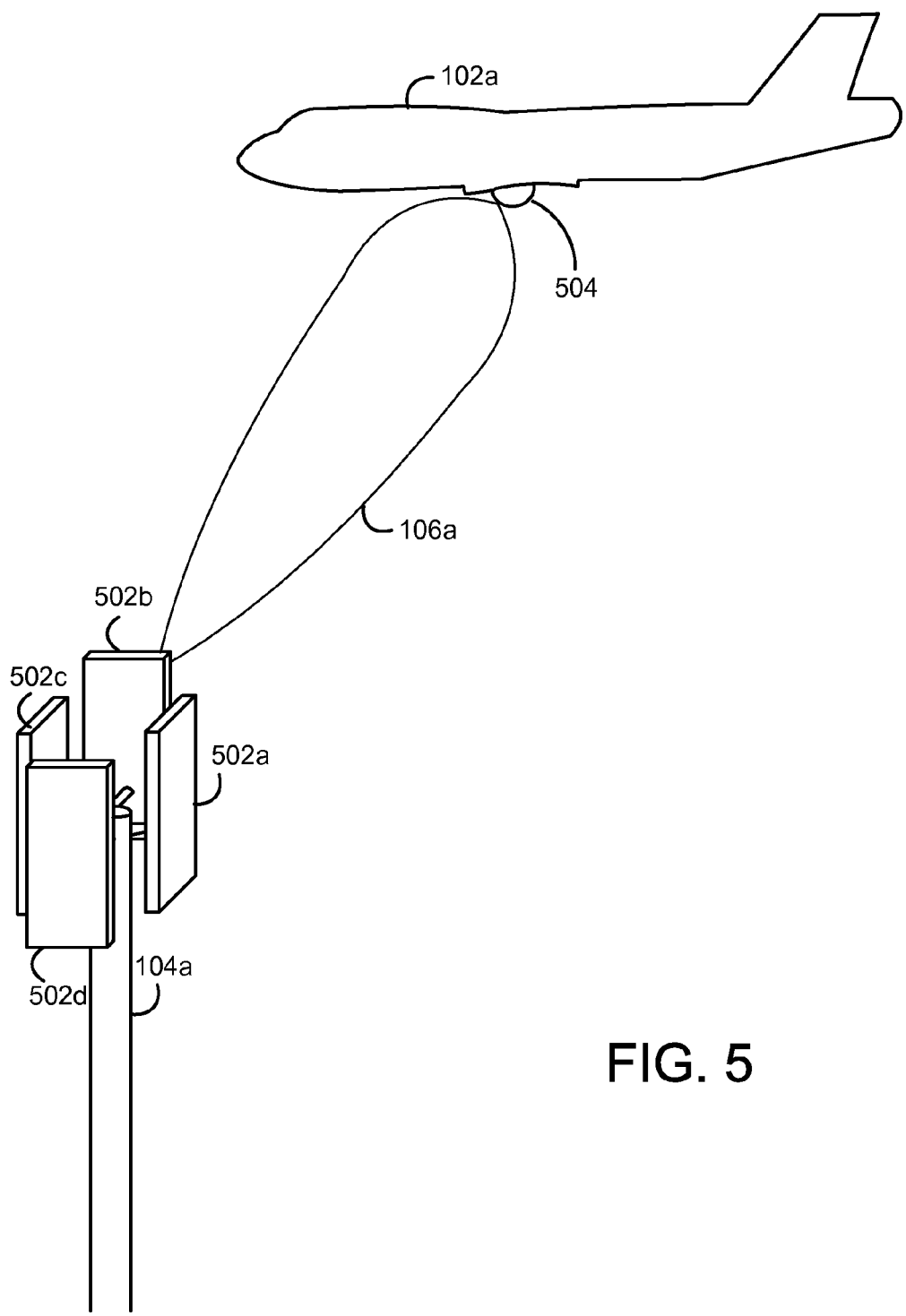
FIG. 5 is a detailed example illustration of an airborne platform in wireless broadband communication with a surface based antenna array including antenna panels, in accordance with some embodiments.

Referring to FIG. 4, one implementation of a base station antenna array 104a includes multiple antenna elements that are used to transmit synchronization signals. This base station antenna array 104*a* forms multiple beams 400, with nulls in between. By varying these beams 400 using a deterministic perturbation, the propagation pattern may be rotated so as to cover a larger area over a period of time. Likewise, a randomized perturbation could also be used to generate a similar result.

In addition to the perturbation techniques used, the performance of synchronization may be modified by varying the time intervals between such perturbations. If the time interval is very short, then the spectral efficiency may be somewhat diminished as administrative overhead is increased; however, if the time interval is too long, then mobile stations may have difficulty in synchronizing with a base station in a timely manner. Perturbations may occur periodically, perturbations may occur randomly, or perturbations may occur upon the satisfaction of one or more conditions. Further, perturbations are not required for each transmission—in some implementations, a synchronization signal is repeated without perturbation for an interval before modification. In some embodiments, perturbations occur after a predetermined time interval (e.g., 1-20 ms). In other implementations, perturbations occur after every x frames, where x is a number greater than or equal to 1.

In addition, in some embodiments, the synchronization beam width may be wider than a communication beam, because the data contained within a synchronization signal is relatively little as opposed to a communication data signal. In some embodiments, the synchronization signal includes a data header indicating base station direction and other pertinent data, which is followed by an instruction to respond. Once the mobile device receives the synchronization signal, including the response instruction, it may generate a return beamform signal which is more narrowly defined and includes a higher gain.

Figure 10B:
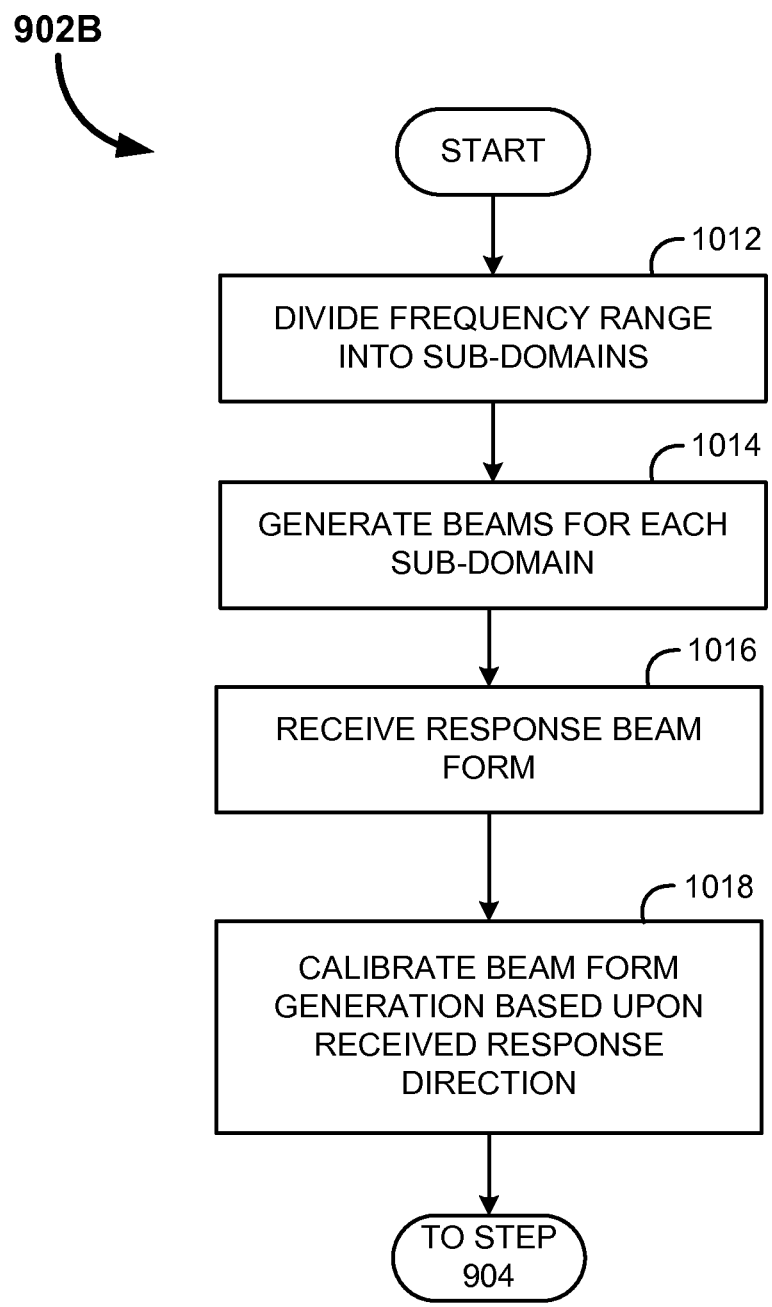
FIG. 10B is a second example flowchart diagram for the process of synchronizing a surface based antenna array with a mobile antenna array in accordance with some embodiments.

Another technique that may be used to improve synchronization is illustrated at the process of FIG. 10B. Here the used spectrum is broken up into N groups, where N is a number greater than 1 at step 1012. For example, in one implementation, spectrum is divided into one group for each antenna. Then, either random perturbation and/or deterministic perturbation may be used for each of the N groups.

Further, the synchronization signals for two or more of the N groups may be simultaneously transmitted, with beams formed in differing directions (either random or coordinated), at step 1014. In this manner, the likelihood of a mobile station falling into a null for all N groups may be significantly reduced or practically eliminated. Consider, for example, a system using a 80 MHz RF channel. This 80 MHz RF channel may be divided into, for example, 4 groups of 20 MHz each. A synchronization signal may be simultaneously transmitted for each of the 4 groups, with the synchronization signal for each group oriented in a different manner. If the beam patterns are oriented in the manner shown in FIG. 4, then a mobile station within range is highly likely to fall in a beam of one of the 4 groups at any given synchronization signal transmission. The beam patterns may be perturbed as discussed above, either in a coordinated manner, or randomly. In some embodiments, each group corresponds to a group of tones, where a tone is one carrier out of, for example, 64, 128, 256, 512, 1024, 2048, 4096, or other number of tones making up a communication channel.

In this process, the system then waits for a return transmission at step 1016. The return response may then be utilized to calibrate, at step 1018, the generation of future training transmissions.

Such a system provides benefit in that multiple beams may be sent, on varying frequencies, within a singular time frame. Therefore the entire time required to synchronize the base station and airborne platform 102*a* may be reduced. The drawback of such a method is that substantially more frequency spectrum is utilized in such a technique. This means that data communication is halted or reduced during synchronization periods. Further, this technique may require more computational power at the base station 110*a* than time division synchronization.

An Airborne platform 102*a* may be configured to receive synchronization signals using multiple antennas, for example, synchronizing to one of the N synchronization groups (such as the strongest received signal) using one, two, or more antennas. The receive signals from two or more antennas may be coherently combined to further extend the synchronization range of the system. Furthermore, when multiple synchronization signals are transmitted (such as when using the N synchronization groups discussed above), a mobile station may combine the multiple groups coherently to increase the synchronization range, or combine the received signals so as to cancel interference. In some embodiments, beamforming is performed on each group separately. In other embodiments, beamforming is performed across some or all of the groups and antennas at once.

Another method of synchronization, suitable for use in some embodiments, will now be discussed. This method relies upon stored data within the Airborne platform 102*a* which indicates the location of all antenna arrays 104*a*. Likewise, through elevation and navigational data, the Airborne platform 102*a* is also aware of its own location. These two location values may be cross referenced to determine when the airborne platform is in range of an antenna array 104*a* and the direction the array 104*a* is located at. When the airborne platform is within range of a surface based antenna array 104*a*, the system may be configured to generate a synchronization beamform from the airborne platform, based upon location data, in order to initiate the communication. The advantage of such a deterministic system is that redundant synchronization beam transmissions may be minimized in some instances. It is also possible that the system may be configured to attempt a hybrid approach where a synchronization beamform based upon location data is first attempted, and only if no response is received will the system revert to a randomized search as discussed in detail above.

B. Training of Beamform Weights

Now, the training of the surface based antenna array 104*a* with the airborne platform 102*a*, as indicated at step 904 of FIG. 9, will be discussed in greater detail. As previously noted, beamformers can be classified as either data independent or statistically optimum, depending on how the weights are chosen. The weights in a data independent beamformer do not depend on the array data and are chosen to present a specified response for all signal/interference scenarios. The weights in a statistically optimum beamformer are chosen based on the statistics of the array data to "optimize" the array response. Some embodiments of the present system may rely upon data independent generation of weights; however, other embodiments, as will be discussed in more detail below, are statistical optimum beamformers.

The multiple side lobe canceller (MSC) is perhaps the earliest statistically optimum beamformer. An MSC consists of a "main channel" and one or more "auxiliary channels". The main channel can be either a single high gain antenna or a data independent beamformer. It has a highly directional response, which is pointed in the desired signal direction. Interfering signals are assumed to enter through the main channel side lobes. The auxiliary channels also receive the interfering signals. The goal is to choose the auxiliary channel weights to cancel the main channel interference component. This implies that the responses to interferers of the main channel and linear combination of auxiliary channels must be identical. The overall system then has a response of zero. In general, requiring zero response to all interfering signals is either not possible or can result in significant white noise gain. Thus, the weights are usually chosen to trade off interference suppression for white noise gain by minimizing the expected value of the total output power.

Choosing the weights to minimize output power can cause cancellation of the desired signal, since it also contributes to total output power. In fact, as the desired signal gets stronger it contributes to a larger fraction of the total output power and the percentage cancellation increases. Clearly this is an undesirable effect. The MSC is very effective in applications where the desired signal is very weak (relative to the interference), since the optimum weights will not pay any attention to it, or when the desired signal is known to be absent during certain time periods. The weights can be adapted in the absence of the desired signal and frozen when it is present.

If the desired signal were known, then the weights could be chosen to minimize the error between the beamformer output and the desired signal. Of course, knowledge of the desired signal eliminates the need for beamforming. However, for some applications enough may be known about the desired signal to generate a signal that closely represents it. This signal is called a reference signal. Typically, a known set of pilots or training symbols are sent from a mobile station to a base station as reference signals; and the base station uses those known pilots or training symbols to calculate beamforming weights. The weights are chosen to minimize the mean square error between the beamformer output and the reference signal.

The weight vector depends on the cross covariance between the unknown desired signal present and the reference signal. Acceptable performance is obtained provided this approximates the covariance of the unknown desired signal with itself. For example, if the desired signal is amplitude modulated, then acceptable performance is often obtained by setting the reference signal equal to the carrier. It is also assumed that the reference signal is uncorrelated with interfering signals. The fact that the direction of the desired signal does not need to be known is a distinguishing feature of the reference signal approach.

Referring again to FIG. 1, when a mobile station, such as, for example, airborne platform 102a or 102b uses multiple antennas to perform beamforming, it is desirable to provide a mechanism such that the airborne platform 102a or 102b can effectively determine beamforming weights. In one implementation, the base stations 104a, 104b and 104c transmit known training symbols or code from the base stations to the airborne platform 102a or 102b. By receiving known signals, the airborne platform 102a or 102b can perform transmit and/or receive beamforming using two or more antennas on the airborne platform 102a or 102b to determine beamforming and/or null-steering weights.

Figure 11:
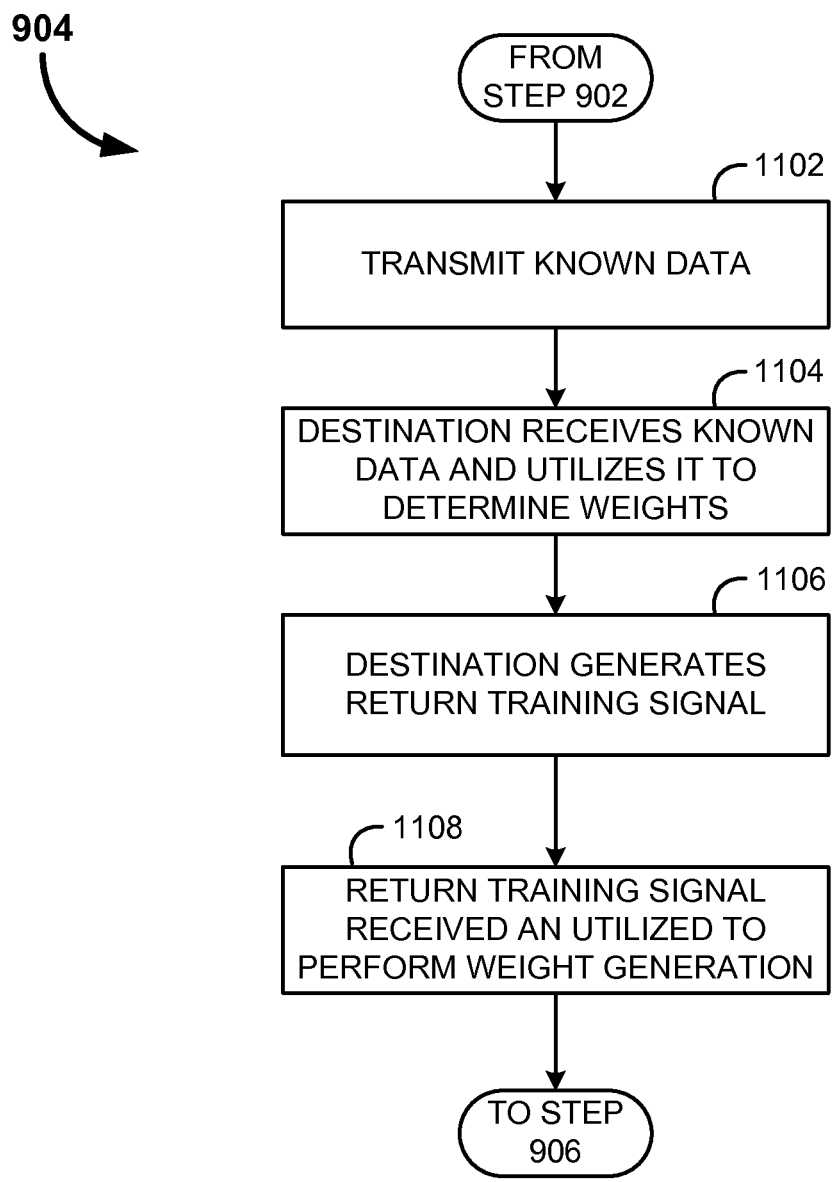
FIG. 11 is an example flowchart diagram for the process of training a surface based antenna array with a mobile antenna array in accordance with some embodiments.

For example, in one embodiment as illustrated at the process of FIG. 11, a base station 104a transmits known data, such as, for example, a column from a Walsh, Golay, Hadamard, or Fourier matrix, from the base station 104a to the airborne platform 102a at step 1102.

This training data (reference signal) is sent using one or more antennas from the base station 104a, and preferably the data would be sent with specific phases and gains on each of the antennas so as to steer a beam towards the airborne platform 102a as determined by the synchronization calibrations, as discussed above. Training data may be transmitted at any time and may be combined with existing signals. For example, a synchronization signal may be augmented with training data to facilitate simultaneous synchronization and training.

At step 1104, the destination device receives the known data and utilizes it to generate weights. An example of how this calculation is performed may be illustrated by the following equation: if known data S is sent, where S is the training data, one could compute weights using the MMSE solution as such, $W=(x^H x)^{-1}(x^H S)$, where x is the received data with dimensions N×M, where N is the number of antennas and M is the number of samples, where samples is in time or tones or both.

Calculated beamforming and/or null-steering weights are retained for a period of time, such as, for example, for a predetermined time interval, until new weights may be calculated, and the like.

The process continues with a return transmission of known data being generated at step 1106. Like the training calculation performed above, the original source may utilize the returned signal for generating weights, at step 1108. The process for training may then end by returning to step 906 of FIG. 9.

C. Null Steering

Now, the generation of a null space in response to detected interference sources, as indicated at step 908 of FIG. 9, will be discussed in greater detail.

In addition to performing beamforming, phases antenna array 104a, such as that found in the airborne platform 102a, may perform null-steering. For example, it may be desirous for an airborne platform 102a to steer a null(s) toward one or more base stations 104a, 104b or 104c that are not presently being used. In this manner, the airborne platform 102a may reduce interference with those base stations 104a, 104b or 104c.

Figure 3:
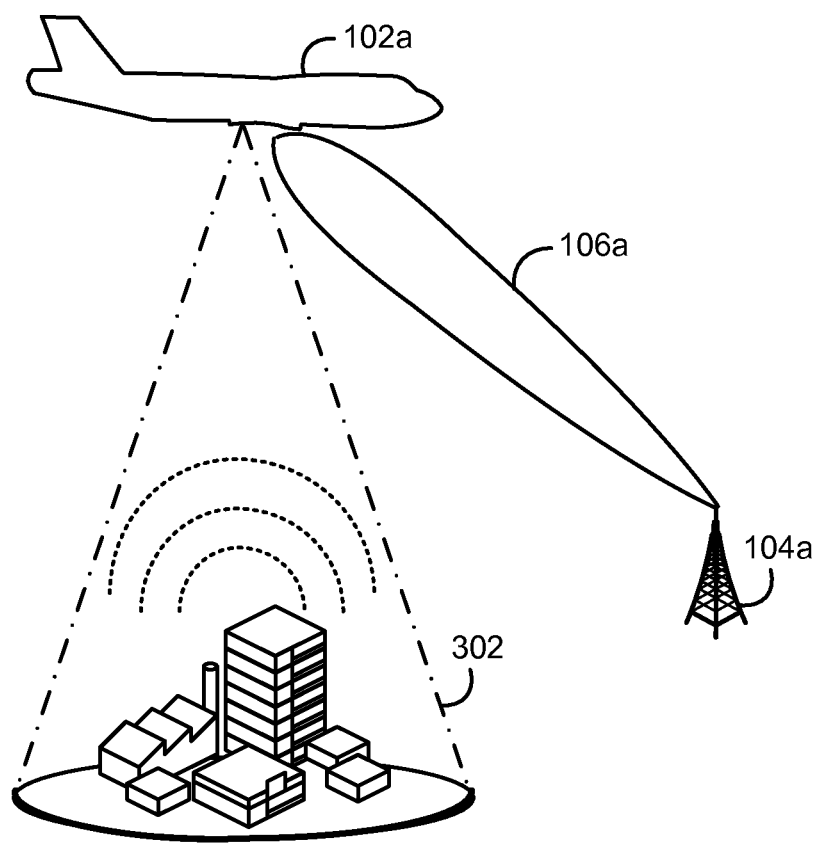
FIG. 3 is an example illustration of an airborne platform orienting a null space on an interference source while in wireless broadband communication with a surface based antenna arrays, in accordance with some embodiments.

During beamforming a main lobe is produced together with nulls and side lobes. As well as controlling the main lobe width (the beam) and the side lobe levels, the position of a null may be controlled. This is useful to ignore noise in one particular direction, while listening for events in other directions. Refer to FIG. 3 where a source of interference is illustrated existing below an airborne platform 102a.

Here the airborne platform 102a is configured to use unlicensed spectrum, thus it is possible that the airborne platform 102a could cause interference with, or be interfered with, by Wi-Fi networks, cordless phones, or other wireless services using unlicensed spectrum, as is prevalent in urbanized locations.

These devices project signal in an omnidirectional fashion in most cases. However, these unlicensed devices must also abide by FCC guidelines and are thus generally low-power devices. Omnidirectional projected waves degrade exponentially as a matter of distance; this, plus the generally low power of the devices, means that the only source of interference for airborne platforms operating in unlicensed spectrum is typically the "close" devices directly below the airborne platform. By steering a null 302 directly under the airborne platform, these potentially interfering sources may be ignored.

Antenna Arrays 104a, 104b or 104c not within the null are capable of communicating with the airborne platform. Likewise, even if an Antenna Array 104*a* is within the null, the beamforming of the Antenna Array 104*a* may have sufficient gain as to enable receipt of the data despite being within a null space.

Figure 12:
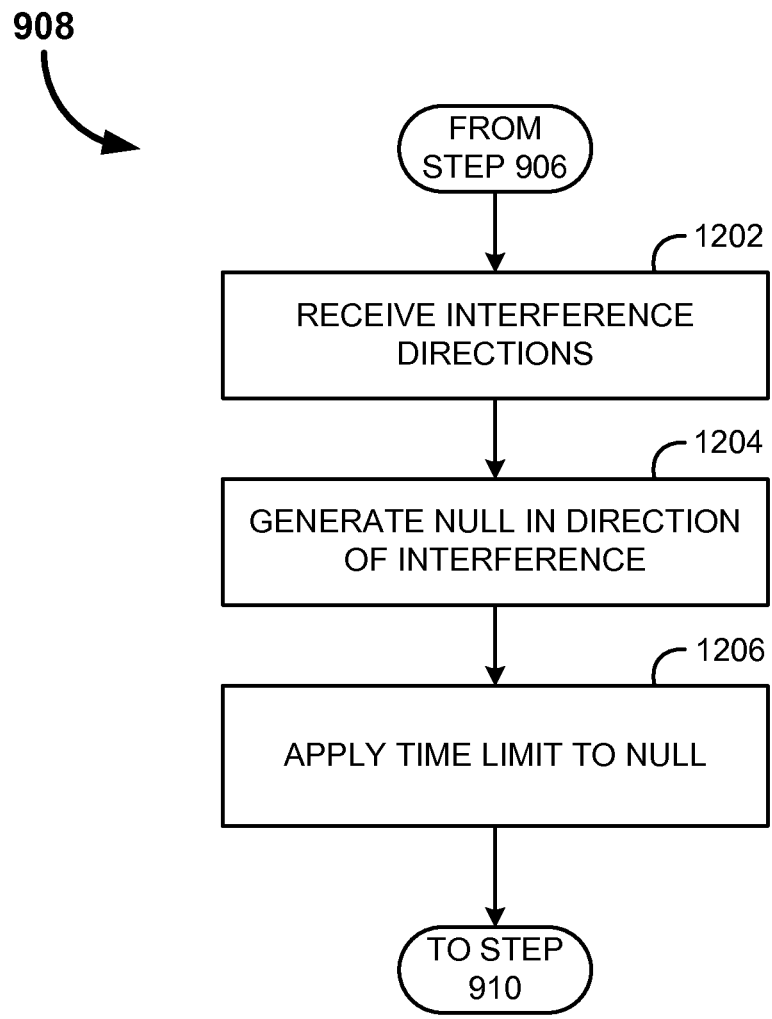
FIG. 12 is an example flowchart diagram for the process of generating a null space to block an interfering signal in accordance with some embodiments.

One embodiment for the process for null generation may be seen in relation to FIG. 12, shown generally at 908. In some other embodiments, a mobile station on an airborne platform 102*a* identifies interference by measuring the received signals and identifying the signals and directions of the signals that don't match expected training. These interference directions are received at step 1202. Then at step 1204, nulls are placed on those identified signals. Any signals that are from other cells, not known, or not scheduled are treated as interference and nulls are placed on transmit and receive in those directions.

Furthermore, in some implementations, a time tail is used so that a null is lessened over time, at step 1206. Thus, when a momentary interference is detected, a null may be placed for a period of time even if the detected interference goes away. Tails are useful for interfering signals that quickly turn on and off—by using a time tail, a null may already be in place when there is a sufficiently short break in transmission of the interfering signals. The process than ends by returning to step 910 for FIG. 9.

While much of null steering has been discussed in relation to eliminating interference, an important note regarding null steering is that this, in conjunction with very specific beamforming on the transmitter side enables the transmitter to send data on the same frequency, at full throughput, to multiple receivers simultaneously. No known transmission system is capable of this feat. It is only possible through the very selective directional signal propagation (beams) being sent to separate targets. Any reflection or bleed of a beam signal not intended for a given receiver is then viewed by the receiver as interference and is ignored through null steering. This enables complete spectrum re-use at 100% throughput.

Figure 15A:
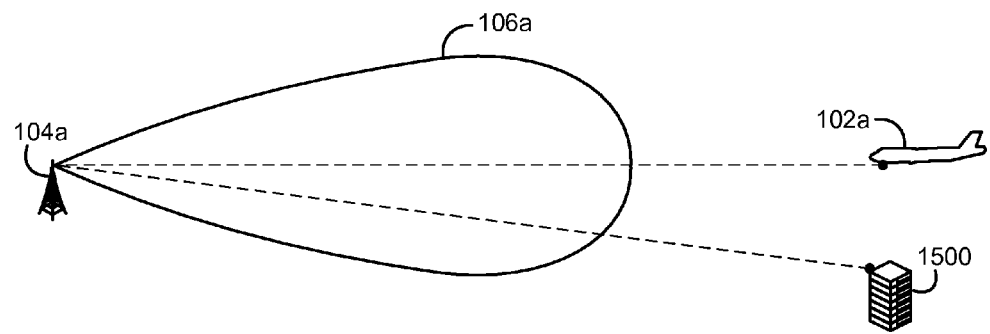
FIGS. 15A and 15B are example illustrations of directional beamforming by an antenna array in range of a target and interference source in accordance with some embodiments.
Figure 15B:
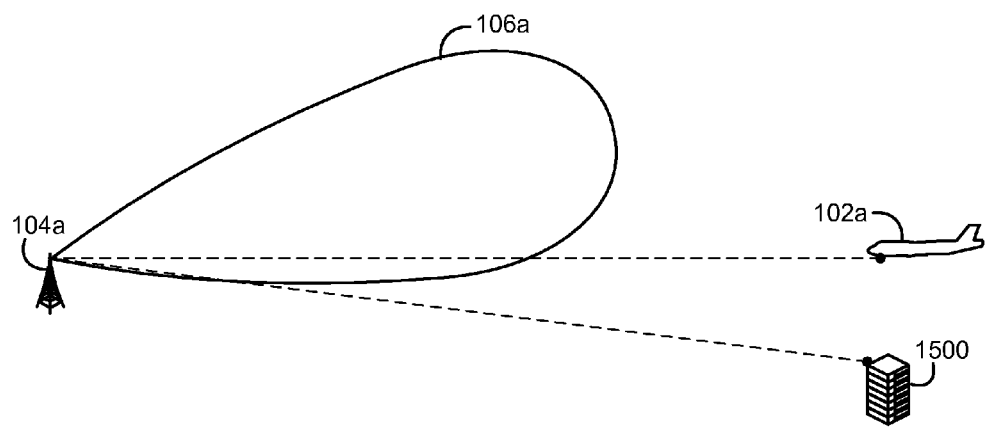

FIGS. 15A and 15B are example illustrations of directional beamforming by an antenna array 104*a* in range of a target and interference source in accordance with some embodiments. These figures illustrate a method of null steering where the transmission target and an interference source are in relatively close proximity to one another. In such cases, it may be impractical to simply steer a null in the direction of the interference source because this would effectively block out the target as well. The target, in these example figures, is an airborne platform 102*a*. A wireless access point in an office building 1500 is the source of interference.

The interfering building 1500 is, in these example illustration, relatively close to the airborne platform 102*a* target. The closeness of the target and interference source makes it such that any null steered to the interference would also block out the target airborne platform 102*a*, which is an undesirable result. The example illustrations indicate differing methods of dealing with this scenario.

In FIG. 15A, the beamform is directed such that maximum gain is directed to the target airborne platform. Processing may be utilized to separate out the interference to some degree, but inevitably some interference is likely to be received as well. The second method of FIG. 15B sacrifices absolute gain in favor of maximizing the difference between gains experienced by the target and interferer. In this example, the beam is oriented askew of the target, but such that the interferer is received with even less gain. Thus, while the target signal may be received with less perceived gain as compared to the example of FIG. 15A, the difference between gain of the interference source and target is larger in the example of FIG. 15B. This may be thought of as a method of null steering whereby beam and null directions are considered in order to maximize the difference between target gain and interference gain.

D. Beamforming

As noted previously, the unlicensed radio spectrum must comply with FCC regulation Part 15, which includes a maximum power envelope for the transmitting device. Given the long range required for communicating with airborne platform, an omnidirectional transmission device, when operating within this power envelope, is undiscernibly over background noise at these great distances. Thus, the gain provided by beamforming is ideally suited to enable the operation of a system where unlicensed spectrum is utilized to communicate with airborne platform. Thus, for transmissions and receipt of transmissions the system may, in some embodiments, rely upon beamforming, as indicated previously at steps 910 and 912 of FIG. 9. Additionally, some embodiments may utilize other frequencies and are not necessarily constrained by this part of the FCC regulations. Even so, it may be desirous to improve signal gain in order to overcome interference sources, and achieve substantially larger effective ranges.

The term beamforming derives from the fact that early spatial filters were designed to form pencil beams in order to receive a signal radiating from a specific location and attenuate signals from other locations. "Forming beams" seems to indicate radiation of energy; however, beamforming is applicable to either radiation or reception of energy.

Systems designed to receive spatially propagating signals often encounter the presence of interference signals. If the desired signal and interferers occupy the same temporal frequency band, then temporal filtering cannot be used to separate signal from interference. However, the desired and interfering signals usually originate from different spatial locations. This spatial separation can be exploited to separate signal from interference using a spatial filter at the receiver. Implementing a temporal filter requires processing of data collected over a temporal aperture. Similarly, implementing a spatial filter requires processing of data collected over a spatial aperture.

In some embodiments, a beamformer linearly combines the spatially sampled time series from each sensor to obtain a scalar output time series in the same manner that an FIR (finite impulse response) filter linearly combines temporally sampled data. Spatial discrimination capability depends on the size of the spatial aperture; as the aperture increases, discrimination improves. The absolute aperture size is not important, rather its size in wavelengths is the critical parameter. A single physical antenna (continuous spatial aperture) capable of providing the requisite discrimination is often practical for high frequency signals since the wavelength is short. However, when low frequency signals are of interest, an array of sensors can often synthesize a much larger spatial aperture than that practical with a single physical antenna. Note, each composite antenna represents a sensor in some embodiments.

A second very significant advantage of using an array of sensors, relevant at any wavelength, is the spatial filtering versatility offered by discrete sampling. In many application areas it is necessary to change the spatial filtering function in real time to maintain effective suppression of interfering signals. This change is easily implemented in a discretely sampled system by changing the way in which the beamformer linearly combines the sensor data. Changing the spatial filtering function of a continuous aperture antenna is impractical.

Beamforming takes advantage of interference to change the directionality of the array 104a whereby constructive interference generates a beam and destructive interference generates the null space. For example, if two airborne platform 102a and 102b use directional antennas such that RF emissions radiate predominantly towards the surface, then interference between two distant airborne platform 102a and 102b can be abated. By using directional antennas, the communication system may provide increased spectral efficiency, possibly even permitting Antenna Arrays 104a, 104b and 104c to use the same frequencies or a smaller subset of frequencies.

As airborne platform 102a, 102b and 102c fly, the relative direction from the airborne platform 102a, 102b and 102c to the Antenna Arrays 104a, 104b and 104c changes. Accordingly, it is desirable to use be able to change the direction in which RF emissions radiate. Many such techniques are known in the art, for example, one or more directional antennas may be used. These directional antennas may be mechanically positioned to transmit in the desired direction. Alternatively, a set of directional antennas may be used, with a transceiver switching between the available antennas to select a suitably-oriented antenna. Further, in some embodiments, a smart antenna array 104a is used to dynamically vary directivity of transmission and/or reception.

Beamforming using a smart antenna array 104a, during transmission, is accomplished by controlling the phase and/or relative amplitude of the signal at each transmitter, in order to create a pattern of constructive and destructive interference in the wave front. Similarly, when receiving, information from different sensors is combined in such a way that the expected pattern of radiation is preferentially observed (null steering).

The ability to beamform in this manner requires a minimum of two antennas in the antenna array 104a. In some embodiments, four antennas are located at each transceiver; both airborne platform 102a and base station. This directionality benefit of beamforming has been known by those skilled in the art for some time. In general, beamforming may be accomplished in a number of known ways, as is known by those skilled in the art. For an example of a particular method of implementing directional beamforming, see: B. D. V. Veen and K. M. Buckley. *Beamforming: A versatile approach to spatial filtering*. IEEE ASSP Magazine, pages 4-24, April 1988.

An additional example of the mathematics behind beamforming may be found in the article by Michael Leabman entitled *Adaptive Band-Partitioning for Interference Cancellation in Communication Systems*. Massachusetts Institute of Technology Press, February 1997.

Most array literature specifies spatial dependence in terms "angles" which is intuitive. It is also possible to define the wavenumber variable $\vec{k}$ which is a spatial vector in terms of Euclidean space, where, $|\vec{k}|=\omega/c$, $\omega$ being the radian frequency ($2\pi f$), and c being the propagation speed in free space. Thus $|\vec{k}|=\omega/c=2\pi f/c=2\pi/\lambda$ has dimensions of 1/length, where the wavelength $\lambda=f/c$, and $c=3*10^8$ m/s for radio waves. While the standard angular representation does describe the response over the region for all real signals, the full wavenumber space, or 'virtual' space, is more useful in analyzing the consequences of spatial aliasing.

Now consider an array of N elements sampling an area of space where the element locations are governed by $[\vec{z}_i, i=1, \ldots, N]$. The output from each sensor is input to a linear, time invariant filter having the impulse response $w_i(\tau)$. The outputs of the filter are summed to produce the output of the array y(t), $$y(t) = \sum_{i=1}^{N} \int_{-\infty}^{\infty} w_i(t-\tau)x(\tau, \vec{z}_i)d\tau$$

Using the Fourier representation for a space-time signal, a plane wave $x(t, \vec{z}_i)$ of a single frequency may be represented by a complex exponential in terms of a radian frequency $\omega$, and vector wavenumber $\vec{k}$:

$$x(t, \vec{z}_i) = e^{j(\omega t - \vec{k} \cdot \vec{z}_i)}$$

The array response to a plane wave is as follows:

$$y(t) = \sum_{i=1}^{N} \int_{-\infty}^{\infty} w_i(t-\tau)x(\tau, \vec{z}_i)d\tau$$

$$= \sum_{i=1}^{N} \int_{-\infty}^{\infty} w_i(t-\tau)e^{j(\omega\tau - \vec{k} \cdot \vec{z}_i)}d\tau$$

$$= \sum_{i=1}^{N} \int_{-\infty}^{\infty} w_i(t')e^{-j\omega t'} e^{-j\vec{k} \cdot \vec{z}_i} e^{j\omega t} dt' \text{ where } \tau = t - t'$$

$$= \sum_{i=1}^{N} w_i(\omega)e^{j(\omega t - \vec{k} \cdot \vec{z}_i)}$$

letting, $$W(\omega) = \begin{bmatrix} w_1(\omega) \\ \vdots \\ w_N(\omega) \end{bmatrix} \text{ and } E(k) = \begin{bmatrix} e^{-j\vec{k} \cdot \vec{z}_1} \\ \vdots \\ e^{-j\vec{k} \cdot \vec{z}_N} \end{bmatrix}$$

becomes $y(t) = W^+(\omega)E(k)e^{j\omega t}$ where $W(\omega, \vec{k}) = W^+(\omega)E(k)$ is the frequency wavenumber response. The frequency wavenumber response evaluated versus direction $\vec{k}$, is known as the beampattern, $$B(a(\theta, \phi)) = W(\omega, \vec{k})\bigg|_{\vec{k}=\frac{2\pi}{\lambda}a(\theta,\phi)}$$

where $a(\theta, \phi)$ is the unit vector in spherical coordinates.

The most widely used array, suitable for some embodiments, is a linear uniformly weighted array with N elements and an inter-element spacing of $\Delta z$. Note, such an array is used by way of example, and other array designs are considered within the scope of this invention.

If a frequency independent uniform weighting of 1/N is used, a frequency wavenumber response is arrived at:

$$W(\omega, k) = \frac{1}{N} \sum_{n=-\frac{N-1}{2}}^{\frac{N-1}{2}} e^{-j\vec{k} \cdot \hat{a}_z n \Delta z}, \text{ where } \vec{k} \cdot \hat{a}_z = k_z$$

$$= \frac{\text{sinc}\left(k_z \frac{L}{2}\right)}{\text{sinc}\left(k_z \frac{\Delta z}{2}\right)}$$

Evaluating for $$k_z = |k|\sin(\theta) = \frac{2\pi}{\lambda}\sin(\theta),$$

where θ is defined with respect to the angle to the z axis, a beampattern is calculated as:

$$B(\omega, \theta) = \frac{\text{sinc}\left(2\pi\sin(\theta)\frac{L}{2\lambda}\right)}{\text{sinc}\left(2\pi\sin(\theta)\frac{\Delta z}{2\lambda}\right)}, \text{ where } L = N\Delta z.$$

Multiple beams may be utilized by each base station to communicate with multiple aircrafts at one time, as is illustrated at FIG. 2. For example, a four antenna array 104a may generate up to four simultaneous beams and nulls. Likewise, any combination of beams and nulls adding to four is possible. With more antennas on the array 104a this number of beams is extendable to meet capacity requirements. Likewise, each airborne platform may generate up to four beams, given the four antenna design, in order to communicate with multiple base stations simultaneously.

II. Antenna Array Design

Attention will now be drawn to FIGS. 5 to 7B which illustrate unique antenna array 104a designs which enable proper coverage for long range communications to an airborne platform 102a. At FIG. 5, an Antenna Array 104a is illustrated wirelessly communicating with an airborne platform 102a. The Airborne platform 102a includes its own antenna array 504.

The array 504 within the airborne platform 102a may be of similar design to that of the surface based Antenna Array 104a. As illustrated the array 504 may be contained within a belly mounted aerodynamic pod. Likewise, it is possible that the array 504 be in a recessed location on the airborne platform, within the winglets, or within the front radar dome.

In these embodiments, the Antenna Array 104a may include four antenna panels 502a, 502b, 502c and 502d. By modulating the amplitude and phase of the signal at the base station 110a and providing to the modulated signals to each of the antenna panels 502a, 502b, 502c and 502d, respectively, a directional signal (i.e., a beam) 106a is generated.

Figure 6:
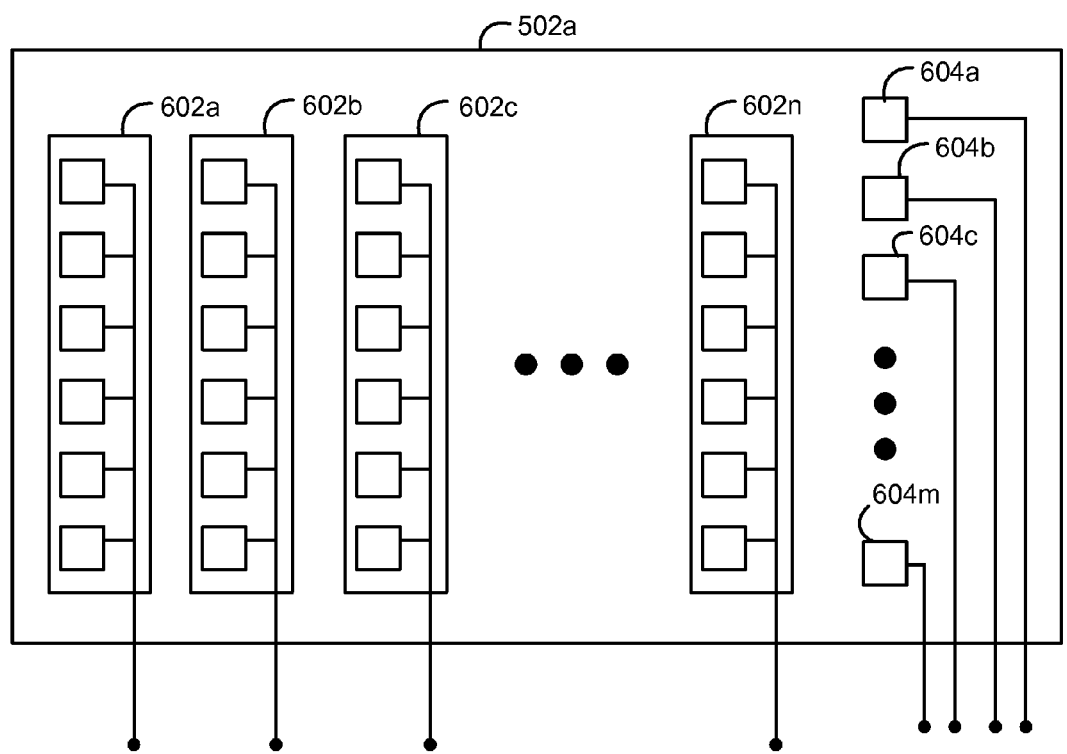
FIG. 6 is a logical example illustration of an antenna array panel, in accordance with some embodiments.

FIG. 6 provides a more detailed illustration of the Antenna Panel 502a. The logic behind an optimized antenna is that to identify an airborne target (e.g., an airborne platform), the antenna is required to look at the entire sky at 360° horizontal and 180° vertically. However, the gain required by the antenna is reduced the higher one looks vertically. This is due to the aircrafts geometry in relation to the antenna array 104a. An airborne platform 102a directly above the antenna array 104a is relatively close to the array 104a (i.e., typically 10,000 to 35,000 feet above the antenna array 104a). However, an airborne platform 102a low vertically, as seen from the antenna array 104a, is a much greater distance from the array 104a, often a hundred miles or more distant.

Thus, ideally, the antenna array 104a is designed whereby the lower image area is viewed in higher gain. Typical antennas are currently available in high gain design. Most high gain antennas have wide horizontal beam width but very narrow vertical beam widths. An example would be a 2.4 GHz antenna with 17 dBi of gain that has +/−45 degrees horizontal beam width, but only +/−10 degrees vertical/elevation beam width. Conversely, broad coverage antennas are also available; however, these antennas tend to have a much reduced gain value. For example, typical antennas at 2.4 GHz with 90 degrees vertical beam width would have less than 3-5 dBi of gain. Further, other gain and coverage antenna types are also considered within the scope of some embodiments.

The antenna design provided at FIG. 6 enables the antenna panel 502a to provide both high gain in the horizontal coverage area, and yet have full coverage. This is accomplished by transmitting across more than one high gain, but limited coverage, antennas 602a, 602b, 602c, 602d to 602n. These high gain, but limited coverage, antennas 602a consist of a series of antenna elements wired in parallel. The presently illustrated high gain, but limited coverage, antennas 602a are shown including six antenna elements; however, this is purely for illustrative purposes. More or fewer antenna elements are considered as part of this application. In general, the more antenna elements in parallel in a singular high gain, but limited coverage, antenna 602a increases gain of the antenna, but also limits the coverage area. Thus, the high gain, but limited coverage, antennas 602a may be selected as to provide optimum gain to coverage requirements.

In addition to the high gain, but limited coverage, antennas 602a, each antenna panel 502a may also include more than one broad coverage antennas 604a, 604b, 604c, 604d to 604n. Typically these lower gain but greater coverage antennas 604a have few antenna elements (typically between one and four antenna elements). Fewer elements reduce gain, but enhance coverage area.

The result of such an antenna design is very narrow but high gain coverage along the horizon, and weaker but broader coverage on the higher vertical angles. This comports well to the geometry of airborne platforms flying near the Antenna Array 104a, as discussed above.

Figure 7A:
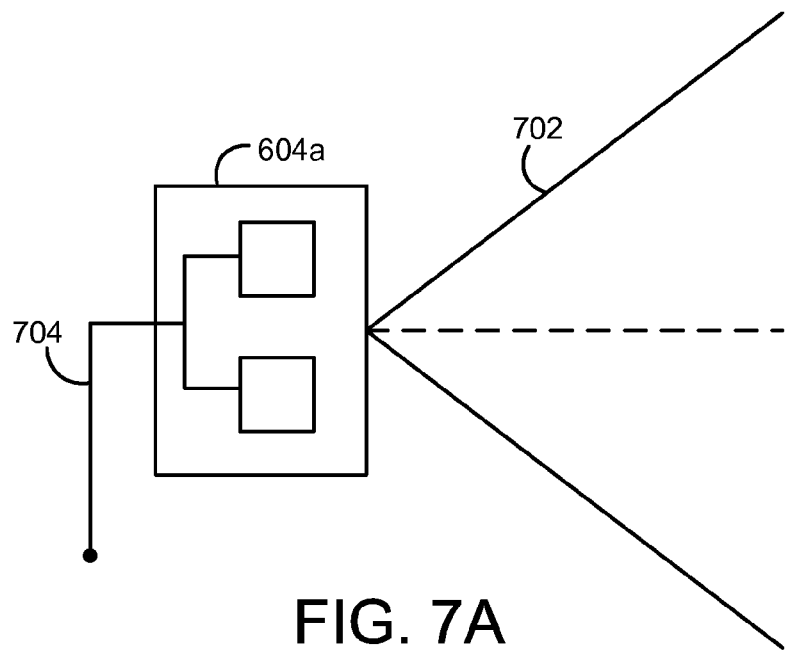
FIG. 7A is an example illustration of a broad coverage antenna in accordance with some embodiments.
Figure 7B:
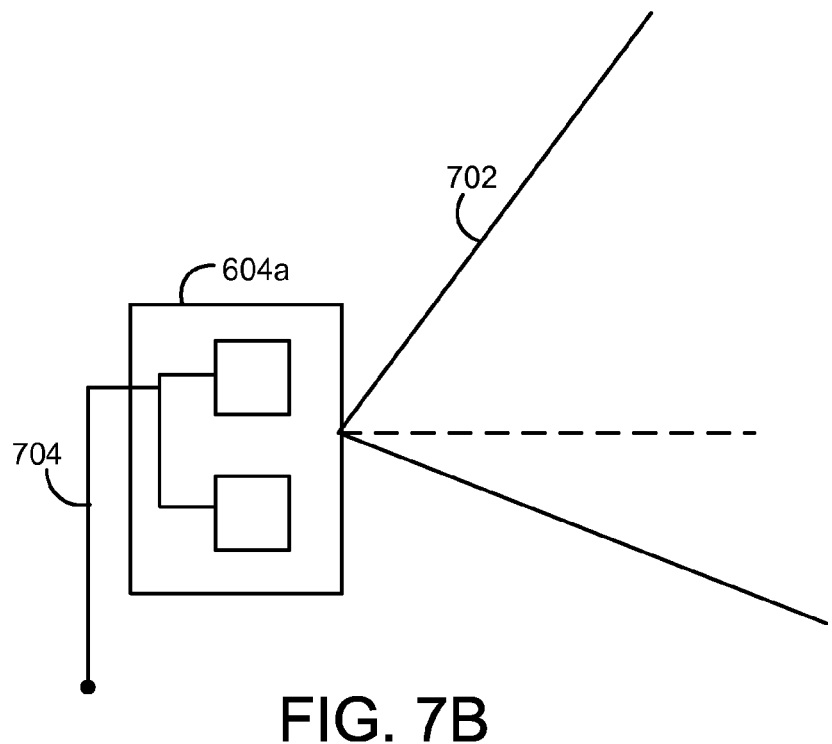
FIG. 7B is an example illustration of a squinted broad coverage antenna in accordance with some embodiments.

The coverage may be further improved by squinting or skewing the coverage angle of low gain or broad coverage antennas 604a, as shown in the comparison of FIGS. 7A and 7B. In FIG. 7A, the broad coverage antenna 604a is shown including two antenna elements. The contact lead 704 is coupled directly between the antenna elements resulting in a coverage area 702 centered around the midline of the broad coverage antenna 604a. As noted above, broad coverage antennas 604a typically include between one and four antenna elements. Squinting of the broad coverage antennas 604a is possible whenever it includes more than one antenna element.

In FIG. 7B, by contrast, the contact lead 704 is coupled closer to one of the antenna elements thereby altering the relative phases of the drive signal to each element, resulting in a coverage area 702 which is tilted above the midline of the broad coverage antenna 604a. This is referred to as "squinting" the antenna. By altering the phase of each antenna element relative to others, this squinting can be varied to suit the desired coverage area. Given that in the antenna panels 502a the lower vertical coverage area is being viewed by the high-gain antennas 602a, there is no need for the broad coverage antennas 604a to cover the same viewing area. Thus these antennas may be squinted up to cover higher vertical angles. Thus the broad coverage antennas 604a provide complete coverage of the airspace above the Antenna Array 104a.

III. Load Balancing between Base Stations

Figure 13:
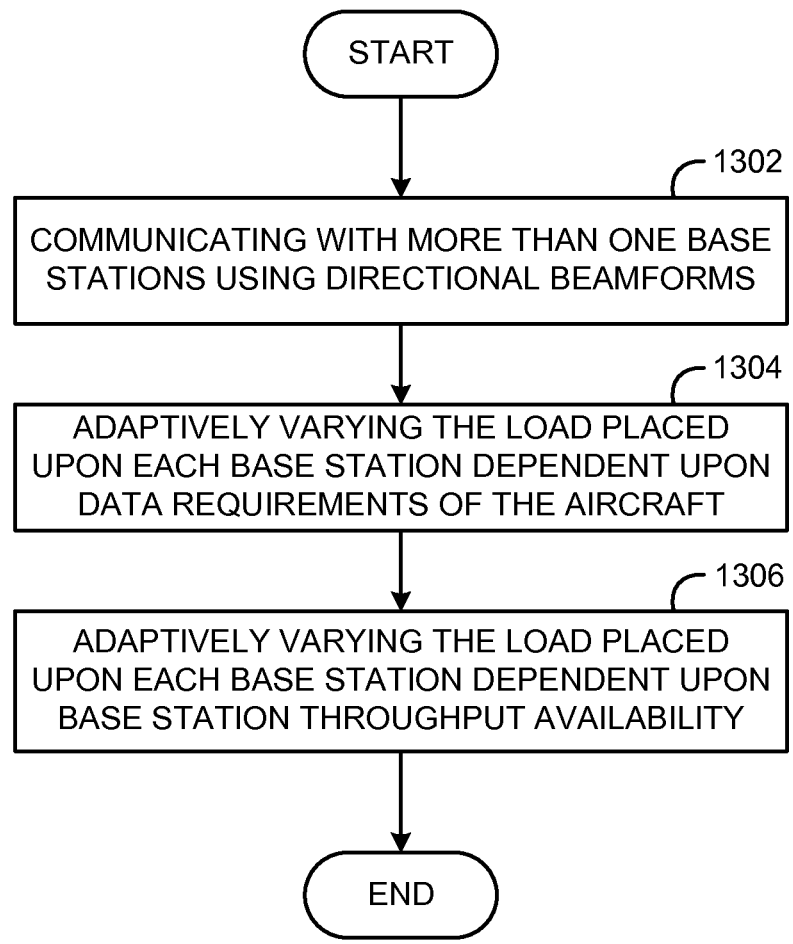
FIG. 13 is an example flowchart diagram for the process of balancing communication loads between multiple base stations in accordance with some embodiments.

Furthermore, at seen in the example process of FIG. 13, a broadband wireless communication system enabling data communications with airborne platform 102a and 102b may be improved by balancing loads across multiple base stations 104a, 104b and 104c. Using beamforming, an airborne platform 102a, instead of communicating with a single base station 104a, may be communicate with multiple base stations, simultaneously, by forming a beam directed towards base station 104a, forming a beam directed towards base station 104b, and then combining the results, as in step 1302.

Load balancing provides a number of benefits to the system. First of all, it enables increased data transfer rates since no single base station is likely to become overburdened. Likewise, by relying upon multiple base stations, the system allows for higher burst throughput, as each base station may send data to the airborne platform simultaneously.

Further, network fidelity is increased, because if there is a disconnect with any given base station, the remaining base stations may compensate accordingly. Lastly, by balancing loads between multiple base stations, transfer from one cell to another when the airborne platform moves out of the coverage area of a base station's antenna array 104a is easier to perform, and there is no lapse in connectivity.

Consider, for example, the system shown in FIG. 2. An airborne platform 102a, using multiple antennas to perform beamforming, communicates with multiple base stations 104b and 104c simultaneously, by forming a beam 106f directed towards base station 104b and a beam 106e directed towards base station 104c. In this manner, the airborne platform 102a can significantly increase system capacity. Furthermore, using beamforming in this manner, beams 106e and 106f may be transmitted using the same frequencies at the same time from the same antennas without interfering with one another, thereby increasing capacity without using additional spectrum.

In some embodiments, the airborne platform 102a may dynamically adjust capacity based on utilization, as indicated at step 1304. For example, the airborne platform 102a may initially use a single beam 106f to communicate with base station 104b. When utilization increases (either at the base station 104b or at the airborne platform 102a), the airborne platform 102a may add a second beam 106e to communicate with base station 104c. The airborne platform 102a may use the additional capacity in any manner, including, for example, by splitting utilization between the base stations 104b and 104c, or by dividing load based on some criteria such as overall number of communication channels ongoing at any given base station. Many network load-balancing techniques are known in the art, and any such technique now known or later developed may be used in this manner. The embodiment discussed above initiates and controls load balancing from a mobile station, such as airborne platform 102a; however, load balancing also may be initiated from a base station 104b or 104c, as indicated at step 1306, or through any combination of airborne platform and base stations operating in concert.

The load balancing implementations discussed above use two beams 106e and 106f; however, some implementations may provide for additional beams. For example, an airborne platform 102a using N antennas may form up to N beams. Each of these beams may be directed towards a different base station. In some implementations, multiple beams are formed and directed towards a single base station; however, in such implementations, when multiple beams are directed to a single base station, each of the beam so directed, is configured to use different frequencies so as to avoid interference.

IV. Multiplexing Processing Elements

The processing capabilities necessary to perform null-steering and/or beamforming, such as those techniques described above, are not insignificant. Furthermore, it may be desirable to provide a commercial system that is scalable, for example, from handling a single 10 MHz channel to a larger channel, such as, for example, 20 MHz, 40 MHz, 80 MHz, or greater.

Typically, when a system is forced to handle N-times more bandwidth, it requires N-times more equipment. For example, one approach to building a scalable system is to build a processing device capable of handling 10 MHz, and by simply adding additional 10 MHz processing devices to scale up. Thus, an 80 MHz bandwidth system would require eight 10 MHz processing devices. Furthermore, the antenna outputs from each of the devices would be combined using one or more RF combiners/splitters for each antenna. However, the use of combiners/splitters attenuates signals, losing valuable gain.

An alternative approach to scaling from 10 MHz to 80 MHz of bandwidth would be to increase the processing capabilities of the digital board such that it is capable of processing the entire 80 MHz bandwidth channel. Because processing capabilities required for 80 MHz of bandwidth are significantly higher than that required for 10 MHz of bandwidth, it is unlikely to be desirable or cost-effective to use a single board with current technology. As processing technologies evolve however, such an embodiment may be readily utilized.

Instead, in some embodiments, a hybrid approach may be used to leverage the benefits of each approach by combining the two techniques and adding an intermediate step. Instead of using multiple devices capable of handling a piece of the total available spectrum, the functions of analog radios and digital baseband processors are divided such that Xradios are used along with Y digital baseband processing devices.

One such scalable system may be designed by breaking up the bandwidth into N groups. For example, four devices could be utilized to dividing an 80 MHz into 20 MHz groups for processing. In this embodiment, a separate radio may be used for each digital processing device. The resulting analog signals are combined (for transmit) or split (for receive) by RF splitter/combiner, which is then coupled to the antenna. This arrangement may be replicated for each available antenna.

Figure 8:
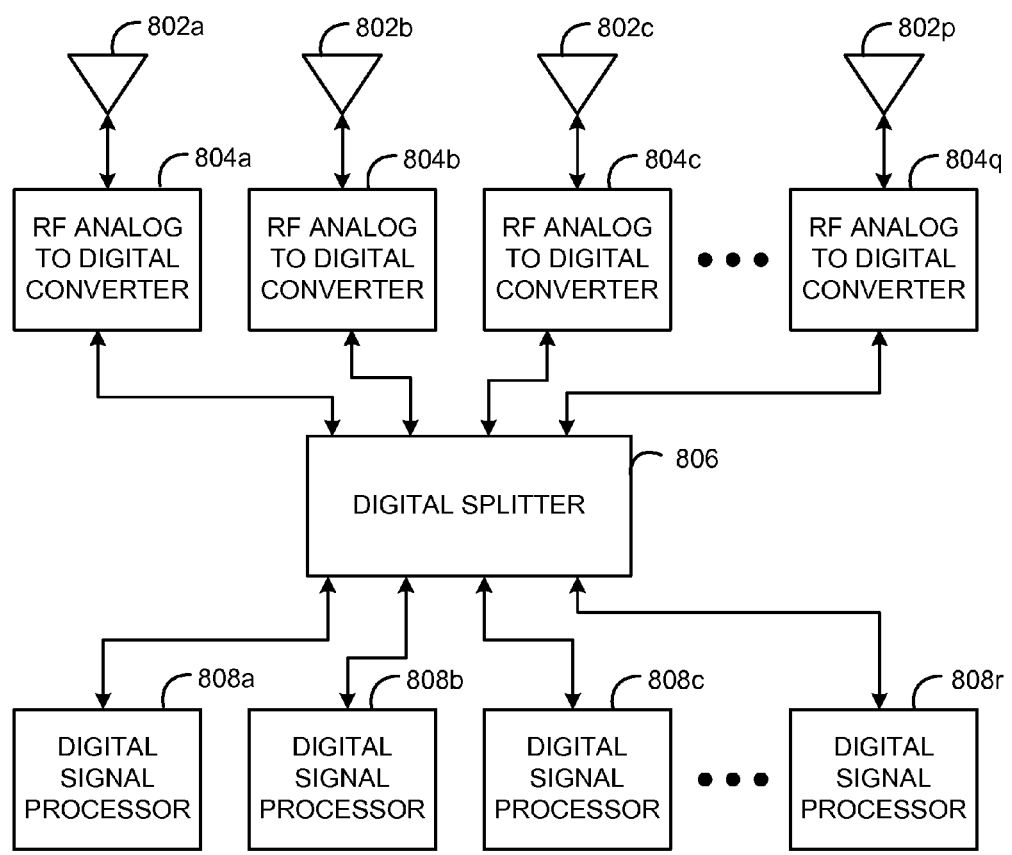
FIG. 8 is an example block diagram of a scalable architecture for the data delivery system in accordance with some embodiments.

In another embodiment, as illustrated at FIG. 8, the Antenna (802a, 802b, 802c to 802p) may instead couple directly to a Radio Frequency (RF) board including a down converter and an Analog to Digital (A-D) converter (804a, 804b, 804c to 804q). For example, assume that the signal received by the antennas is 2.45 GHz, in some embodiments. The RF converter may reduce the signal to a lower bit rate to enable processing, say 80 MHz. However, with an increase in antennas, the final processing requirements are then 80 MHz times the N antennas present, for this example. This much data may be difficult for any given processing unit to handle. Instead, in the present example, assume that the digital processors are capable of handling 20 MHz of bandwidth data. Thus the data streams must be divided into manageable parts for processing. This may be accomplished by a digital splitter 806 coupled to the Analog to digital converters (804a, 804b,

804*c* to 804*q*) which may split the data flow to each Digital Signal Processor (DSP) (808*a*, 808*b*, 808*c* to 808*r*) for processing.

The problem with splitting the data is that it is a signal and thus cannot be simply split into time sections. Instead, in this embodiment, the digital splitter 806 may orthogonalize the signals utilizing a Fast Fourier Transformation (FFT) in order to split the signal among the various DSPs (808*a*, 808*b*, 808*c* to 808*r*).

A larger or smaller number of antennas (802*a*, 802*b*, 802*c* to 802*p*) may be used with the processing boards and radios as shown. For example, two antennas may be used with four digital processing devices (808*a*, 808*b*, 808*c* to 808*r*) and four radios (804*a*, 804*b*, 804*c* to 804*q*).

Another embodiment for processing the data may rely upon fewer radios. For example, in some embodiments, a single radio is used. This eliminates the need for an RF splitter/combiner, thus reducing attenuation. However, to implement such a system, an additional step is used to break up the channel into smaller frequency groups before digital baseband processing. Instead of each radio handling a portion of the entire channel, the radio handles the entire channel, and the spectrum is divided before baseband processing by an intermediate digital processing device.

The intermediate digital processing device may divide the channel into frequency groups using several techniques, including by performing a Hadamard or Fast Fourier Transform (FFT) on receive for each antenna/radio after the data is digitized from analog-to-digital, and to perform a Hadamard or IFFT on each antenna/radio for transmit. The groups fill in the inputs to the IFFT/FFT and Hadamard. For example, to divide an 80 MHz channel into 4 groups on receive, 4 samples at 80 MHz feed the FFT and produce 4 outputs, each output being a 20 MHz channel. Conversely, 4 groups of 20 MHz can be used to feed the digital-to-analog conversion on transmit, resulting in an 80 MHz signal.

In this manner, the number of analog radios may be reduced, while still increasing the number of digital processing devices that may be independently varied as is necessary or desirable. Such a system significantly reduces complexity and costs for base stations by eliminating redundant radios and other hardware components. Further, all of the disclosed systems are scalable, thus as bitrates increase, the systems may be modified to meet the processing demands.

V. Dynamic Frequency Selection

In some embodiments of a broadband wireless communication system, mobile devices such as those found in the airborne platforms may use various portions of a communications channel. For example, a communication channel may be divided into N groups, with mobile devices capable of using any of the N groups. As a mobile device moves, for example, from sector to sector or from cell to cell, interference and bandwidth utilization may vary. Accordingly, it is desirable in some embodiments to dynamically vary frequency utilization.

For example, in one implementation, the mobile device is capable of processing N groups of an 80 MHz channel, where each frequency group is 80 MHz/N. Based on some criteria, such as, for example, measured interference, measured utilization, request from a base station, or the like, the mobile device is capable of tuning its RF to a different frequency group. In some embodiments, multiple groups may be used at one time. In such an implementation, a mobile device may be configured such that it is capable of choosing to not transmit on certain groups, preferably transmitting only on those groups having less interference and/or utilization.

In some implementations, it may be desirable for the mobile device to be able to use different frequencies and/or different groups on different beams. For example, if the mobile device is close to the base station antenna array 104*a* and less gain is needed, the mobile device 102*a* could tune each antenna to a different channel so as to handle 80 MHz/N bandwidth on each of N antennas, thus using all 80 MHz. Each antenna would handle a different 80 MHz/N frequency. This would enable a single system to use all the antennas for beamforming on a smaller 80 MHz/N channel when gain and coverage is needed, or the system could process all 80 MHz by having each RF/antenna tuned to one of the 80 Mhz/N channels. As interference and/or utilization are detected, those affected frequencies would not be used.

Some implementations use a combination of load-balancing and/or dynamic frequency selection to provide constant quality of service (QoS) as a mobile device embodied in an airborne platform 102*a* passes from one base station's antenna array 104*a* to another.

VI. Radio Frequency Power Control

In addition, it is desirable, in some embodiments, in a broadband wireless communication system, to use as little power as is necessary, to mitigate potential interference. One way to perform RF power control on a mobile device is for a communicating base station 110*a* to measure the received signal level. This signal level may result from mobile device on an airborne platform 102*a* transmission using multiple antennas or a single antenna. Based on this measurement, the base station 110*a* sends a message to the airborne platform 102*a* indicating whether to increase and/or decrease its transmission power. Based on this message, the communication device located on the airborne platform 102*a* adjusts the transmit power on the two or more antennas that it is currently using to communicate with the base station's antenna array 104*a*.

VII. Data Transfer Via Relay

In some embodiments, the presence of surface based antenna arrays may be lacking, such as in the middle of the ocean. In these cases it may be possible to extend the functional range of data communications by relaying signals from one airborne platform 102*a* to another. Typically, airborne platforms follow common flight paths, both over land and the oceans. The advantage of these flight paths includes reduction of distance by traveling closer to the poles. Likewise, regulations, such as FAA regulations require set flight paths whereby the airborne platform are within a particular distance of a landing location at any given time. Thus, at any given time, along these trans-ocean airways, any given airborne platform 102*a* is likely within transmittable distance to another airborne platform 102*a*. This enables a given airborne platform 102*a* to transmit to another airborne platform along the flight path using any of the previously identified beamforming methodologies. The receiving airborne platform 102*a* may then relay the transmission to another airborne platform 102*a*, and so forth until an available surface based antenna array 104*a* is reached. In this way, data communication may be maintained even in circumstances where no surface based antenna array 104*a* is within transmission range. In some embodiments, a tail located antenna array may be best situated to facilitate communication between airborne platforms.

In order to further enable this form of trans-ocean relaying, maritime vessels including mobile devices may likewise be utilized as relay points. In such a way, it may be possible to extend data communication coverage even farther.

VIII. Adaptive Allocation between Upload and Download

Another novel feature of some embodiments is the ability to adaptively allocate upload and download bandwidth allowances. Most data connections, with the Internet for example, have a fixed allocation between upload and download. Typically the upload (PC to Internet) is given less bandwidth than the download (Internet to PC). This reflects the direction that most of the data usually flows; typically from the Internet to computer user. Internet requests (upload) are typically succinct. The usual ratio is 5 to 1, meaning the bandwidth set aside for download is 5 times greater than the bandwidth allocated for upload (Internet requests). Hence, when a person runs an Internet speed test, they might see a ratio like 1.5 Mbps download and 0.3 Mbps upload. Even though during the speed test there is no data being downloaded, the upload bandwidth is fixed and remains constant, always around 300 Kbps. This is done to be sure when the user of the Internet hits the "Enter" button to send a URL to the Internet, the request is not placed on hold until the downloading data is complete. It makes the Internet connection appear to be faster than it is.

To maximize throughput in both directions, some embodiments are configured to dynamically allocate bandwidth between upload and download. If there is no upload traffic, the entire 100 Mbps bandwidth is used for download. If there is no download, the entire 100 Mbps is used for upload. Furthermore, because the allocation is dynamic, if there is traffic both ways at the same time, the smaller-size data traffic will get less bandwidth than the higher volume of data being transferred. This process optimizes the throughput in both directions. An Internet speed test will show 100 Mbps download and also 100 Mbps upload. This is only possible because the throughput is fast enough that it is not necessary to reserve or dedicate portions of the bandwidth for the upload.

In some alternate embodiments, a particular portion of the bandwidth may be reserved for, say, transmission of operational and safety data from the airborne platform to the surface. This enables these embodiments of the system to always transfer critical data regardless of load balances. Thus, even if every passenger on the airborne platform downloads a movie at the same time, it is possible that the system maintains some set bandwidth for crucial safety and operational data. All remaining bandwidth, however, may be dynamically allocated as discussed above.

For example, assume 20 Mbps of the total 100 Mbps bandwidth is reserved for critical data transfers. Now assume that 30 gigabytes is being downloaded by the airborne platforms passengers. Likewise, 10 gigabytes of data is being uploaded by the passengers, as well. In such a case, the non reserved bandwidth of 80 Mbps may be allocated in a three to one split dynamically (i.e., 20 Mbps for uploads and 60 Mbps for downloads).

IX. Correction of Doppler Effect for Airborne Platform Beamforms

The Doppler Effect is an issue whenever substantial speeds are involved. In the case of beamforming, the Doppler Effect may alter the phase of a transmission, which may likewise influence the direction of signal propagation. Thus, the Doppler Effect is typically seen as a significant hurdle to applying beamforming radio communications to airborne platform.

A point-to-point radio returns a reply signal right back to the precise frequency vector from which the communication originated. To give a radio mobility, such as is being performed by some embodiments, the signal is returned to a different location (due to the movement/mobility of the airborne platform) within a specified proximity to the original signal source. In the case of a moving object, the location of the signal origin has changed by the time a reply is sent. So the responding signal has to search a bit for the location of the signal's original source. This searching takes a few more nanoseconds than a point-to-point connection. Hence, in some of the embodiments the system may modify "time out" periods. In addition, the direction parameters of the signal are likewise modified to accommodate for phase shifts attributable to the Doppler Effect. In some embodiments, these modifications to the direction parameters may depend upon directionality of signal propagation and speed the airborne platform is traveling at.

In sum, systems and methods for wireless broadband data communication are provided. While a number of specific examples have been provided to aid in the explanation of the present invention, it is intended that the given examples expand, rather than limit the scope of the invention. Although sub-section titles have been provided to aid in the description of the invention, these titles are merely illustrative and are not intended to limit the scope of the present invention.

While the system and methods has been described in functional terms, embodiments of the present invention may include entirely hardware, entirely software or some combination of the two. Additionally, manual performance of any of the methods disclosed is considered as disclosed by the present invention.

While this invention has been described in terms of several preferred embodiments, there are alterations, permutations, modifications and various substitute equivalents, which fall within the scope of this invention. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention.

What is claimed is:

1. A system for wireless communication between an airborne platform and a surface base station, the system comprising:
   an antenna array at an airborne platform configured to:
      generate a plurality of directional synchronization beams, wherein the plurality of directional synchronization beams are directed in at a plurality of corresponding spatial directions;
      receive a response to at least one of the plurality of generated directional synchronization beams thereby determining directionality of a base station from the response;
      receive a training beam including a known data;
      generate weights from the received known data;
      form a directional beam towards a base station, wherein the directional beam is spatially oriented signal propagation originating from the airborne platform, and wherein the directional beam receives signals from the surface base station; and wherein the directional beam is formed using a modified base signal, and wherein the modifying the base signal includes modifying at least one of phase and amplitude using the generated weights;

identify at least one source of interference by flagging all radiating sources, identifying at least one inbound beamform, removing the radiating sources which are generating the at least one inbound beamform from the flagged radiating sources, and setting remaining flagged radiating sources as interference sources; and form at least one null to substantially attenuate the at least one source of interference.

2. The system as recited in claim 1, wherein the directional synchronization beams are generated by introducing at least one of randomized and deterministic perturbations to at least one of phase and amplitude of signal provided to at least one antenna in an antenna array.

3. The system as recited in claim 1, wherein the generating the plurality of directional synchronization beams includes transmitting the plurality of directional synchronization beams in series.

4. The system as recited in claim 1, wherein the generating the plurality of directional synchronization beams includes transmitting the plurality of directional synchronization beams simultaneously.

5. The system as recited in claim 1, wherein
the generated weights modify at least one of phase and amplitude of a base signal, and wherein the modifying of the at least one of phase and amplitude determine directionality of the formed directional beam.

6. The system as recited in claim 1, wherein the known data includes a column from at least one of a Walsh, a Golay, a Hadamard, and a Fourier matrix.

7. The system as recited in claim 1, wherein the at least one null is formed to substantially reduce the signal to interference ratio.

8. The system as recited in claim 1, wherein the at least one null is generated utilizing the surface platform.

9. The system as recited in claim 1, wherein the formed at least one null is modulated over time, utilizing a time tail, in order to reduce the signal to interference ratio.

10. The system as recited in claim 1, wherein the generating the plurality of directional synchronization beams includes transmitting the plurality of directional synchronization beams sequentially.

11. A system for wireless communication between a surface platform and a base station, the system comprising:
an antenna array at a surface platform configured to:
generate a plurality of directional synchronization beams, wherein the plurality of directional synchronization beams are directed in at a plurality of corresponding spatial directions;
receive a response to at least one of the plurality of generated directional synchronization beams thereby determining directionality of the base station from the response;
receive a training beam including a known data;
generate weights from the received known data;
form a directional beam towards the base station, wherein the directional beam is spatially oriented signal propagation originating from the surface platform, and wherein the directional beam receives signals from the base station; and wherein the directional beam is formed using a modified base signal, and wherein the modifying the base signal includes modifying at least one of phase and amplitude using the generated weights;

identify at least one source of interference by flagging all radiating sources, identifying at least one inbound beamform, removing the radiating sources which are generating the at least one inbound beamform from the flagged radiating sources, and setting remaining flagged radiating sources as interference sources; and form at least one null to substantially attenuate the at least one source of interference.

12. The system as recited in claim 11, wherein the directional synchronization beams are generated by introducing at least one of randomized and deterministic perturbations to at least one of phase and amplitude of signal provided to at least one antenna in an antenna array.

13. The system as recited in claim 11, wherein the generating the plurality of directional synchronization beams includes transmitting the plurality of directional synchronization beams in series.

14. The system as recited in claim 11, wherein the generating the plurality of directional synchronization beams includes transmitting the plurality of directional synchronization beams simultaneously.

15. The system as recited in claim 11, wherein
the generated weights modify at least one of phase and amplitude of a base signal, and wherein the modifying of the at least one of phase and amplitude determine directionality of the formed directional beam.

16. The system as recited in claim 11, wherein the known data includes a column from at least one of a Walsh, a Golay, a Hadamard, and a Fourier matrix.

17. The system as recited in claim 11, wherein the at least one null is formed to substantially reduce the signal to interference ratio.

18. The system as recited in claim 11, wherein the at least one null is generated utilizing the surface platform.

19. The system as recited in claim 11, wherein the formed at least one null is modulated over time, utilizing a time tail, in order to reduce the signal to interference ratio.

20. The system as recited in claim 11, wherein the generating the plurality of directional synchronization beams includes transmitting the plurality of directional synchronization beams sequentially.

21. A method for attenuating sources of interference during wireless communication between an airborne platform and a surface base station, the method comprising:
generating a plurality of directional synchronization beams, wherein the plurality of directional synchronization beams are directed in at a plurality of corresponding spatial directions;
receiving a response to at least one of the plurality of generated directional synchronization beams thereby determining directionality of a base station from the response;
receiving a training beam including a known data;
generating weights from the received known data;
forming a directional beam towards a base station, wherein the directional beam is spatially oriented signal propagation originating from the airborne platform, and wherein the directional beam receives signals from the surface base station; and wherein the directional beam is formed using a modified base signal, and wherein the modifying the base signal includes modifying at least one of phase and amplitude using the generated weights;
identifying at least one source of interference by flagging all radiating sources, identifying at least one inbound beamform, removing the radiating sources which are generating the at least one inbound beamform from the flagged radiating sources, and setting remaining flagged radiating sources as interference sources; and forming at least one null to substantially attenuate the at least one source of interference.

22. The method as recited in claim 21, wherein the directional synchronization beams are generated by introducing at least one of randomized and deterministic perturbations to at least one of phase and amplitude of signal provided to at least one antenna in an antenna array.

23. The method as recited in claim 21, wherein the generating the plurality of directional synchronization beams includes transmitting the plurality of directional synchronization beams in series.

24. The method as recited in claim 21, wherein the generating the plurality of directional synchronization beams includes transmitting the plurality of directional synchronization beams simultaneously.

25. The method as recited in claim 21, further comprising using the generated weights to modify at least one of phase and amplitude of a base signal, and wherein the modifying of the at least one of phase and amplitude determine directionality of the formed directional beam.

26. The method as recited in claim 21, wherein the known data includes a column from at least one of a Walsh, a Golay, a Hadamard, and a Fourier matrix.

27. The method as recited in claim 21, wherein the at least one null is formed to substantially reduce the signal to interference ratio.

28. A method for attenuating sources of interference during wireless communication between a surface platform and a surface base station, the method comprising:

generating a plurality of directional synchronization beams, wherein the plurality of directional synchronization beams are directed in at a plurality of corresponding spatial directions;

receiving a response to at least one of the plurality of generated directional synchronization beams thereby determining directionality of a base station from the response;

receiving a training beam including a known data;

generating weights from the received known data;

forming a directional beam towards a base station, wherein the directional beam is spatially oriented signal propagation originating from the surface platform, and wherein the directional beam receives signals from the surface base station; and wherein the directional beam is formed using a modified base signal, and wherein the modifying the base signal includes modifying at least one of phase and amplitude using the generated weights;

identifying at least one source of interference by flagging all radiating sources, identifying at least one inbound beamform, removing the radiating sources which are generating the at least one inbound beamform from the flagged radiating sources, and setting remaining flagged radiating sources as interference sources; and forming at least one null to substantially attenuate the at least one source of interference.

29. The method as recited in claim 28, wherein the directional synchronization beams are generated by introducing at least one of randomized and deterministic perturbations to at least one of phase and amplitude of signal provided to at least one antenna in an antenna array.

30. The method as recited in claim 28, wherein the generating the plurality of directional synchronization beams includes transmitting the plurality of directional synchronization beams in series.

31. The method as recited in claim 28, wherein the generating the plurality of directional synchronization beams includes transmitting the plurality of directional synchronization beams simultaneously.

32. The method as recited in claim 28, further comprising utilizing the generated weights to modify at least one of phase and amplitude of a base signal, and wherein the modifying of the at least one of phase and amplitude determine directionality of the formed directional beam.

33. The method as recited in claim 28, wherein the known data includes a column from at least one of a Walsh, a Golay, a Hadamard, and a Fourier matrix.

34. The method as recited in claim 28, wherein the at least one null is formed to substantially reduce the signal to interference ratio.

* * * * *